United States Patent
Tanaka et al.

[11] Patent Number: 6,116,640
[45] Date of Patent: *Sep. 12, 2000

[54] APPARATUS FOR DETECTING OCCUPANT'S POSTURE

[75] Inventors: Hideyuki Tanaka; Yasukazu Sano; Taichi Tanigawa, all of Tokyo, Japan

[73] Assignee: Fuji Electric Co., Ltd., Japan

[*] Notice: This patent is subject to a terminal disclaimer.

[21] Appl. No.: 09/053,451

[22] Filed: Apr. 1, 1998

Related U.S. Application Data

[63] Continuation-in-part of application No. 08/879,821, Jun. 20, 1997, Pat. No. 6,027,138.

[30] Foreign Application Priority Data

| Apr. 1, 1997 | [JP] | Japan | 9-083097 |
| Apr. 3, 1997 | [JP] | Japan | 9-084899 |
| Nov. 26, 1997 | [JP] | Japan | 9-324764 |

[51] Int. Cl.[7] .................................................. B60R 21/32
[52] U.S. Cl. ............................. 280/735; 348/77; 701/46
[58] Field of Search ........................ 280/734, 735; 340/686.1; 348/77, 143, 148; 701/46, 45, 47

[56] References Cited

U.S. PATENT DOCUMENTS

| 4,472,056 | 9/1984 | Nakagawa et al. | 356/376 |
| 4,490,036 | 12/1984 | Anagnostopoulos | 356/1 |
| 4,553,844 | 11/1985 | Nakagawa et al. | 356/376 |
| 5,071,160 | 12/1991 | White et al. | 280/735 |
| 5,118,134 | 6/1992 | Mattes et al. | 280/735 |
| 5,300,767 | 4/1994 | Steinle et al. | 250/208.1 |
| 5,330,226 | 7/1994 | Gentry et al. | 280/735 |
| 5,398,185 | 3/1995 | Omura | 364/424.05 |
| 5,446,661 | 8/1995 | Gioutsos et al. | 364/424.05 |
| 5,454,591 | 10/1995 | Mazur et al. | 280/735 |
| 5,460,405 | 10/1995 | Faigle et al. | 280/735 |
| 5,482,314 | 1/1996 | Corrado et al. | 280/735 |
| 5,490,069 | 2/1996 | Gioutsos et al. | 364/424.05 |
| 5,528,698 | 6/1996 | Kamei et al. | 348/143 |
| 5,531,472 | 7/1996 | Semchena et al. | 280/735 |
| 5,602,044 | 2/1997 | Yokoyama et al. | 382/278 |
| 5,602,944 | 2/1997 | Yokoyama et al. | 382/278 |

(List continued on next page.)

FOREIGN PATENT DOCUMENTS

| 0738633A1 | 10/1996 | European Pat. Off. . |
| 4023109 | 1/1992 | Germany . |
| 60-061611 | 9/1983 | Japan . |
| 60-015506 | 1/1985 | Japan . |
| 60-061611 | 4/1985 | Japan . |
| 08-169289 | 7/1996 | Japan . |
| 8-169289 | 7/1996 | Japan . |

*Primary Examiner*—Lynda Jasmin
*Attorney, Agent, or Firm*—Rossi & Associates

[57] ABSTRACT

An apparatus for determining an occupant's posture is provided which includes a sensor having at least one pair of linear photosensor arrays each comprising a plurality of photosensor elements, for forming an image of an occupant, a distance measurement processor that derives distance distributions in fields of view monitored by the linear photosensor arrays, from the image of the occupant formed by the sensor, and an occupant discrimination processor that compares patterns of the distance distributions with model patterns of distance distributions preliminarily stored in the processor, so as to determine the presence and posture of the occupant. The linear fields of view are set to extend in a substantially horizontal direction with respect to the occupant, and the occupant discrimination processor first examines at least one of symmetry of the distance distribution pattern in each field of view, concave or convex shape of the pattern, degree of similarity in variations in the distance distribution patterns between adjacent fields of view, and a distribution of distances measured at a particular position of the fields of view, and then determines the posture of the occupant by comparing the patterns of the distance distributions actually measured, with a group of model patterns that is selected in advance depending upon the result of the examination.

14 Claims, 43 Drawing Sheets

U.S. PATENT DOCUMENTS

| | | | |
|---|---|---|---|
| 5,605,348 | 2/1997 | Blackburn et al. | 280/735 |
| 5,626,359 | 5/1997 | Steffens, Jr. et al. | 280/735 |
| 5,653,462 | 8/1997 | Breed et al. | 280/735 |
| 5,702,123 | 12/1997 | Takahashi et al. | 280/735 |
| 5,752,513 | 5/1998 | Acker et al. | 340/686.1 |
| 5,782,485 | 7/1998 | Takeda et al. | 280/735 |
| 5,829,782 | 11/1998 | Breed et al. | 280/735 |
| 5,856,832 | 1/1999 | Pakenham et al. | 345/523 |
| 5,901,978 | 5/1999 | Breed et al. | 280/735 |

(a) NO OCCUPANT
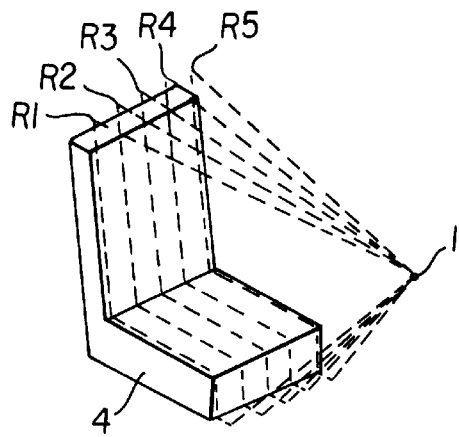
(b) NORMAL POSTURE
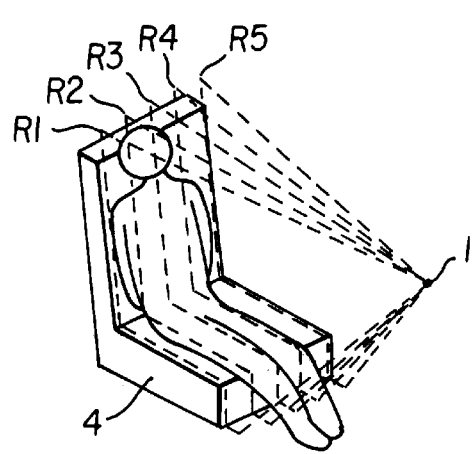
(a') NO OCCUPANT
R1, R2, R3, R4, R5
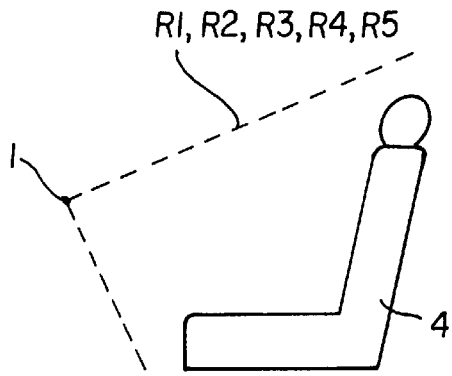
(b') NORMAL POSTURE
R1, R2, R3, R4, R5
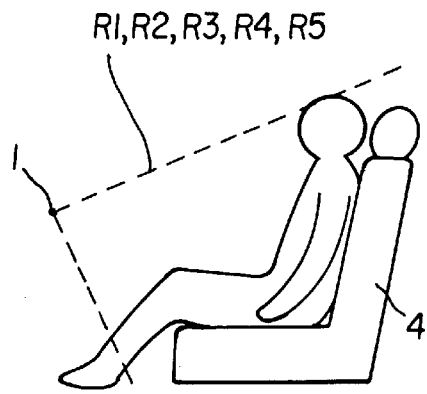
FIG. 18

(a) LEAN FORWARD POSTURE
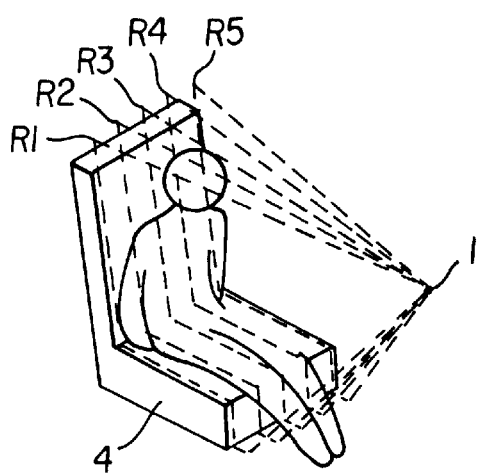
(b) SIDEWAYS POSTURE
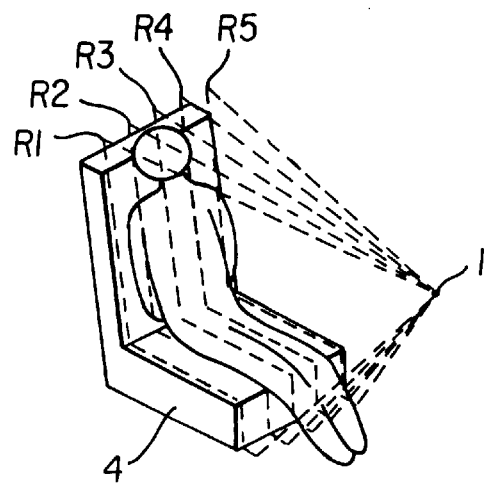
(a') LEAN FORWARD POSTURE
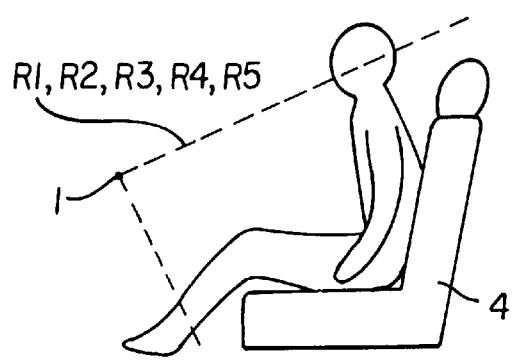
(b') SIDEWAYS POSTURE
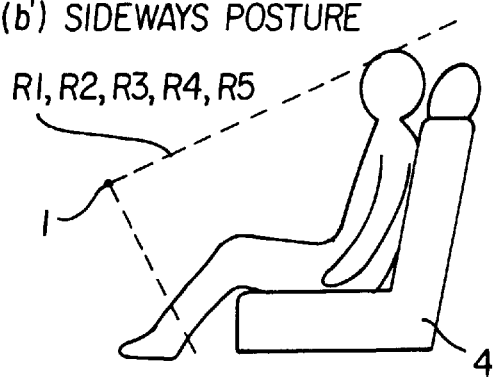
FIG. 19

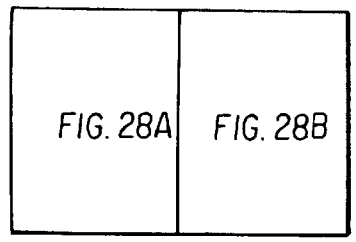

FIG. 28

| OCCUPANT POSTURE DISCRIMINATION ALGORITHMS | | | | |
|---|---|---|---|---|
| EXAMPLES OF OCCUPANT POSTURES | | | NO OCCUPANT | NORMAL POSTURE |
| DISTANCE DISTRIBUTION | | R1 | DISTANCE / FIELD OF VIEW | DISTANCE / FIELD OF VIEW |
| | | R2 | | |
| | | R3 | | |
| | | R4 | | |
| PRINCIPAL OF DISCRIMINATION | DISCRIMINATION OF TENDENCY OF INCREASES/DECREASES IN DISTANCE BETWEEN LINES AT MIDDLE POSITION OF RESPECTIVE FIELDS OF VIEW | | DISTANCE / R1 R2 R3 R4 | DISTANCE / R1 R2 R3 R4 |
| | DISCRIMINATION ON SIMILARITY OF DISTANCE DISTRIBUTION BETWEEN LINES | | R1/R2 : SIMILARITY 1<br>R2/R3 : SIMILARITY 1<br>R3/R4 : SIMILARITY 1 | R1/R2 : SIMILARITY 1<br>R2/R3 : SIMILARITY 1<br>R3/R4 : SIMILARITY 1 |
| | CONCAVITY/CONVEXITY DETERMINATION OF DISTANCE DISTRIBUTION | | R1 : 0<br>R2 : 1<br>R3 : 0<br>R4 : 0 | R1 : 0<br>R2 : 0<br>R3 : 2<br>R4 : 2 |
| | DETERMINATION ON LATERAL SYMMETRY OF DISTANCE DISTRIBUTION | | R1 : 0<br>R2 : 0<br>R3 : 0<br>R4 : 0 | R1 : 0<br>R2 : 0<br>R3 : 0<br>R4 : 0 |

FIG. 28A

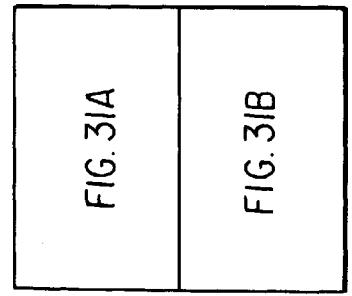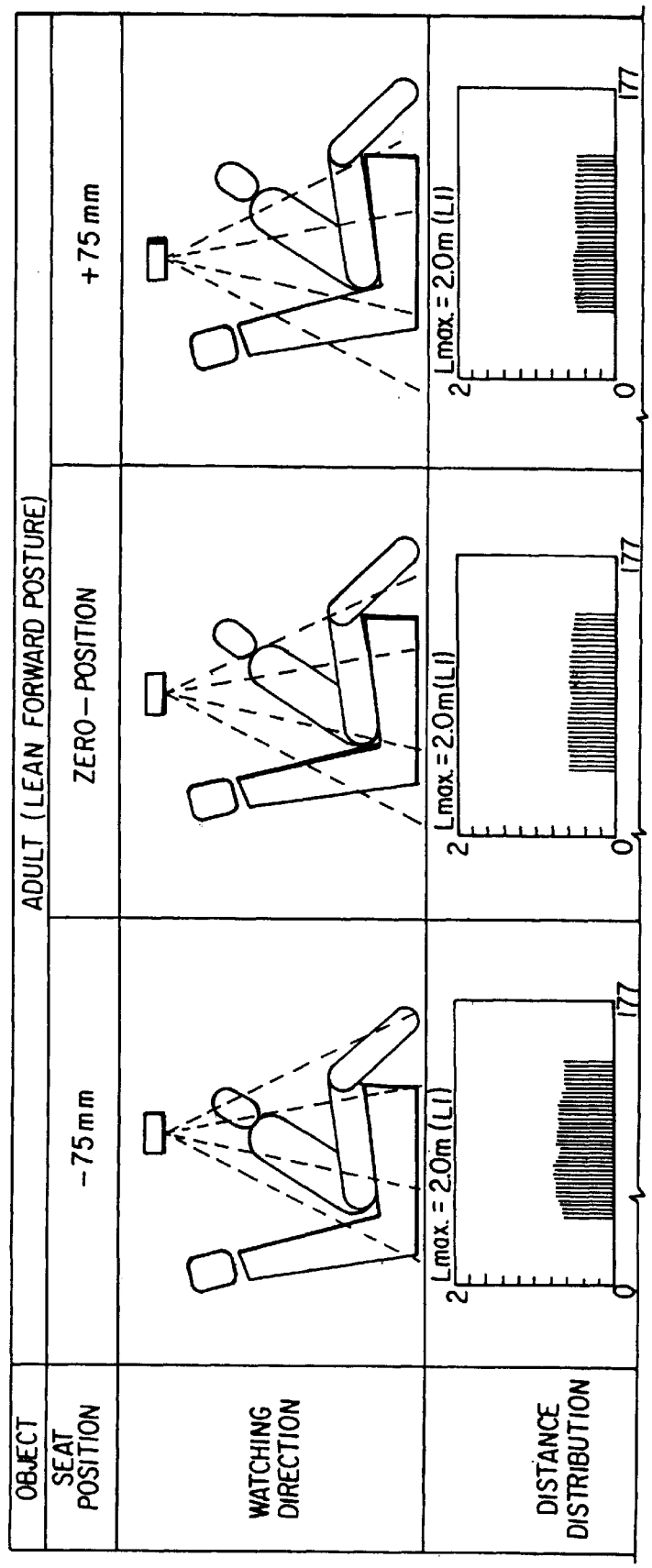

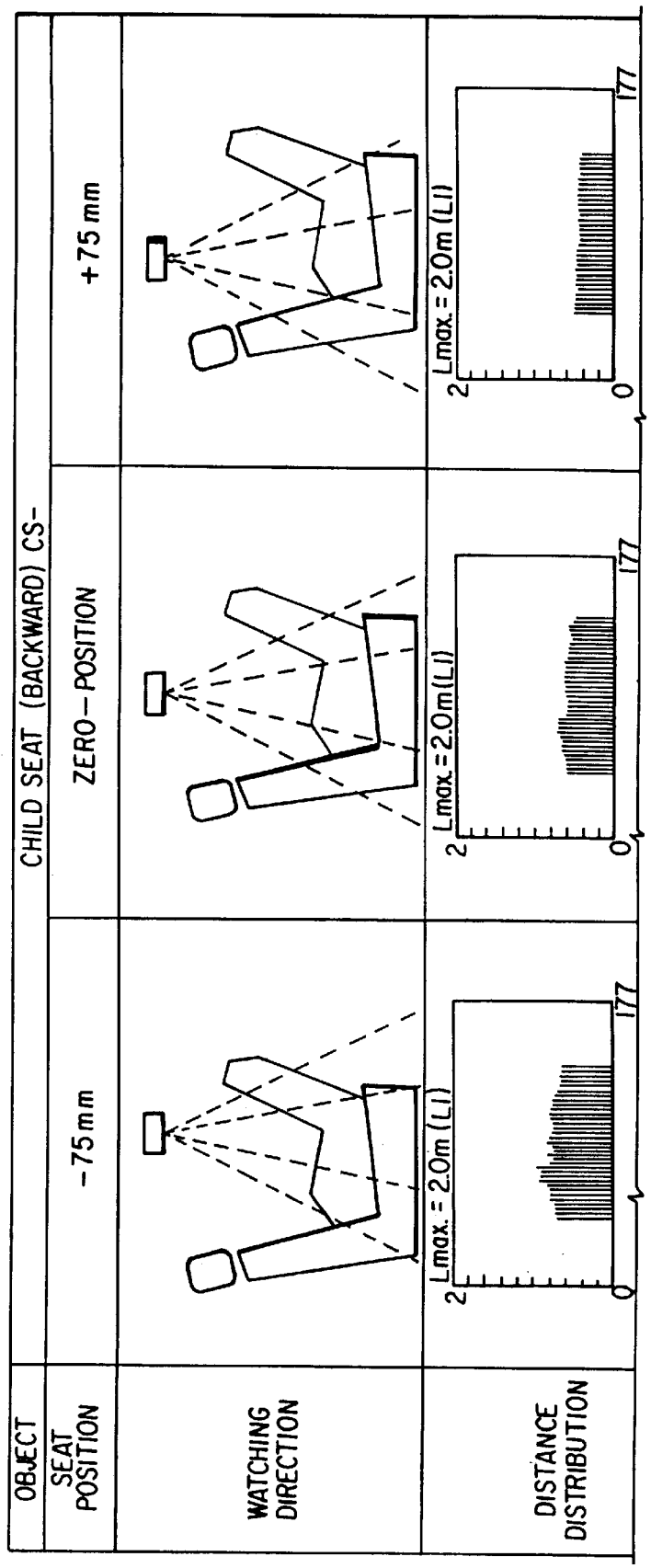

FIG. 34B

APPARATUS FOR DETECTING OCCUPANT'S POSTURE

CROSS-REFERENCE TO RELATED APPLICATIONS

The present application claims the rights of priority of Japanese Application No. 9-83697, filed in Japan on Apr. 1, 1997, Japanese Application No. 9-848899, filed in Japan on Apr. 3, 1997, and Japanese Application No. 9-324764, filed in Japan on Nov. 26, 1997, the subject matter of which is incorporated herein by reference. In addition, the present application is a continuation-in-part application of U.S. patent application Ser. No. 08/879,821, filed Jun. 20, 1997 now U.S. Pat. No. 6,027,138, the contents of which is incorporated herein by reference.

FIELD OF THE INVENTION

The present invention relates to an apparatus for detecting the presence and posture of an occupant, in particular, occupant of an automobile, using linear photosensor arrays each consisting of a plurality of photosensor elements. More particularly, this invention is concerned with an apparatus for detecting the posture of the occupant, which is suitably used for control of an air bag system that is adapted to inflate an air bag installed in the vicinity of a vehicle seat, when detecting a shock on a motor vehicle.

BACKGROUND OF THE INVENTION

The rate of installation of air bags on automobiles has been increasing in recent years, and air bag systems are becoming part of standard equipment regardless of vehicle types. It has been reported, however, that the air bags may become a cause of fatal accidents in the case where a child is standing in front of a seat, or a small woman is sitting in a seat, for example. Thus, various methods for controlling inflation of an air bag have been proposed in an attempt to avoid such fatal accidents. Among these methods, an embodiment shown in the above referenced parent application will be described below wherein a sensor is provided at a ceiling location in an automobile, for measuring distances from the sensor to an occupant, so as to detect the presence and posture of the occupant based on a distribution of the distances thus measured.

FIG. 21 is a schematic view for explaining the embodiment of the parent application, in which an occupant sensor 1, occupant 2, and an automobile 3 are illustrated.

In the example of FIG. 21, an image of the occupant 2 is formed by the occupant sensor 1, which defines four linear fields of view R1, R2, R3 and R4 with respect to the occupant 2, for example, and generates outputs representing a plurality of portions of the occupant located in the respective fields of view. A processing unit that is not illustrated processes the outputs of the occupant sensor 1, to measure distances from the sensor to the respective portions of the occupant and obtain a distance distribution for each field of view, thereby to determine not only the presence of the occupant but also his/her posture based on the distance distributions in the fields of view. The principle of distance measurement will be described later.

A variety of postures of occupants, or the like, may be determined by the above method. FIGS. 22–24 show the relationship among the vehicle seat, posture of an occupant, and fields of view of the sensor, and FIGS. 25–27 show results of distance measurements by the occupant sensor.

More specifically, FIG. 22(a) is a perspective view of a vehicle seat on which no occupant sits, FIG. 22(a)' is a side view corresponding to FIG. 22(a), FIG. 22(b) is a perspective view of a vehicle seat with an occupant who sits in a normal posture, FIG. 22(b)' is a side view corresponding to FIG. 22(b), FIG. 22(c) is a perspective view of a vehicle seat on which an occupant sits while leaning forward, and FIG. 22(c)' is a side view corresponding to FIG. 22(c). FIG. 23(a) is a perspective view showing a vehicle seat on which a child seat is mounted to face forward, along with a child sitting in the child seat, FIG. 23(a)' is a side view corresponding to FIG. 23 (a), FIG. 23(b) is a perspective view showing a vehicle seat on which a child seat is mounted to face backward, along with a child sitting in the child seat, FIG. 23(b)' is a side view corresponding to FIG. 23((b), FIG. 23(c) is a perspective view showing a vehicle seat and a child who is standing in front of the seat in a vehicle compartment, and FIG. 23(c)' is a side view corresponding to FIG. 23(c). FIG. 24 is a perspective view showing a vehicle seat with an occupant who sits sideways on the seat. A side view corresponding to FIG. 24 is similar to that of FIG. 22(b)' showing the occupant having the normal posture, and is therefore omitted herein.

FIG. 25(a), 25(b), 25(c) are examples of patterns of distance distributions obtained in the cases of FIG. 22(a), 22(b), 22(c), respectively, and FIG. 26(a), 26(b), 26(c) are examples of patterns of distance distributions obtained in the cases of FIG. 23(a), 23(b) and 23(c), respectively. FIG. 27(a) shows examples of patterns of distance distributions obtained in the case of FIG. 24, and FIG. 27(b) shows examples of patterns of distance distributions obtained in the case where a child seat facing forward is mounted on a vehicle seat with no child sitting in it. In the distance distribution charts of FIG. 25(a) through FIG. 27(b), the vertical axis represents distance from the sensor, and the horizontal axis represents position within the field of view. This also applies to other distance distribution charts that will follow unless specified otherwise.

It will be understood from the above charts that distances measured in each field of view R1, R2, R3, R4 are obtained as discrete values. The concept to obtain such discrete distance values to form a pattern of distance distribution will be described later.

The presence and posture of a vehicle occupant is normally determined through a so-called pattern matching, namely, by comparing the pattern of distance distribution obtained for each field of view in the above manner with model patterns. There are, however, a considerably wide variety of model patterns that vary depending upon the presence and posture of a vehicle occupant, and further upon the distance or inclination from a reference position of the vehicle seat, for example. This undesirably requires an enormous amount of processing time to compare the pattern of distance distribution in a certain field of view with all of these model patterns.

SUMMARY OF THE INVENTION

It is therefore an object of the present invention to reduce the processing time required for determining the presence and posture of an occupant, in particular, processing time required for pattern matching.

To accomplish the above object, there is provided according to the first aspect of the present invention an apparatus for determining an occupant's posture, comprising: a sensor having at least one pair of linear photosensor arrays each comprising a plurality of photosensor elements, the sensor forming an image of an occupant; a distance measurement processor that derives a distance distribution in each of at least one linear field of view that is monitored by the at least one pair of linear photosensor arrays, from the image of the occupant formed by the sensor; and an occupant discrimination processor that compares a pattern of the distance distribution with a plurality of model patterns of distance distributions that are preliminarily stored in the occupant discrimination processor, so as to determine the presence and posture of the occupant; wherein the above-indicated at least one linear field of view is set to extend in a substantially horizontal direction with respect to the occupant, the occupant discrimination processor checking if the pattern of the distance distribution in each of the at least one linear field of view has symmetry in a lateral direction, and then determining the posture of the occupant by comparing the pattern of the distance distribution with a group of the model patterns of distance distributions that is preliminarily selected depending upon whether the pattern of the distance distribution has symmetry or not.

In the apparatus as described above, the symmetry of the pattern of the distance distribution may be determined by laterally inverting the pattern of the distance distribution in each of the at least one linear field of view with respect to a central portion thereof, obtaining differences in distances at corresponding positions of the pattern of the distance distribution before inverted and the pattern of the distance distribution after inverted within the each of the at least one linear field of view, and determining whether each of the differences is not greater than a predetermined value, or whether an integral value of the differences is not greater than a predetermined value.

According to the second aspect of the present invention, there is provided an apparatus for determining an occupant's posture, comprising: a sensor having at least one pair of linear photosensor arrays each comprising a plurality of photosensor elements, the sensor forming an image of an occupant; a distance measurement processor that derives a distance distribution in each of at least one linear field of view that is monitored by the at least one pair of linear photosensor arrays, from the image of the occupant formed by the sensor; and an occupant discrimination processor that compares a pattern of the distance distribution with a plurality of model patterns of distance distributions that are preliminarily stored in the occupant discrimination processor, so as to determine the presence and posture of the occupant; wherein the above-indicated at least one linear field of view is set to extend in a substantially horizontal direction with respect to the occupant, the occupant discrimination processor determining a degree of similarity in terms of variations in the pattern of the distance distribution between adjacent ones of the at least one linear field of view, and then determining the posture of the occupant by comparing the pattern of the distance distribution with a group of the model patterns of distance distributions that is preliminarily selected depending upon the degree of similarity.

In the apparatus as described above, the degree of similarity between adjacent ones of the at least one linear fields of view may be determined by obtaining differences in variations in the pattern of the distance distribution at corresponding positions of the adjacent ones of the at least one linear field of view, and determining whether each of the differences is not greater than a predetermined value, or an integral value of the differences is not greater than a predetermined value.

According to the third aspect of the invention, there is provided an apparatus for determining an occupant's posture, comprising: a sensor having at least one pair of linear photosensor arrays each comprising a plurality of photosensor elements, the sensor forming an image of an occupant; a distance measurement processor that derives a distance distribution in each of at least one linear field of view that is monitored by the at least one pair of linear photosensor arrays, from the image of the occupant formed by the sensor; and an occupant discrimination processor that compares a pattern of the distance distribution with a plurality of model patterns of distance distributions that are preliminarily stored in the occupant discrimination processor, so as to determine the presence and posture of the occupant; wherein the above-indicated at least one linear field of view is set to extend in a substantially horizontal direction with respect to the occupant, the occupant discrimination processor determining a concave shape or a convex shape of the pattern of the distance distribution between a first position and a second position in each of the at least one linear field of view, and then determining the posture of the occupant by comparing the pattern of the distance distribution with a group of the model patterns of distance distributions that is preliminarily selected depending upon whether the pattern of the distance distribution has the concave shape or convex shape.

In the apparatus as described above, the concave shape or convex shape of the pattern of the distance distribution is determined by comparing an average value of distances measured at the first position and the second position in each of the at least one linear field of view, with a distance measured at an intermediate position between the first and second positions.

According to the fourth aspect of the present invention, there is provided an apparatus for determining an occupant's posture, comprising: a sensor having at least one pair of linear photosensor arrays each comprising a plurality of photosensor elements, the sensor forming an image of an occupant; a distance measurement processor that derives a distance distribution in each of at least one linear field of view that is monitored by the at least one pair of linear photosensor arrays, from the image of the occupant formed by the sensor; and an occupant discrimination processor that compares a pattern of the distance distribution with a plurality of model patterns of distance distributions that are preliminarily stored in the occupant discrimination processor, so as to determine the presence and posture of the occupant; wherein the above-indicated at least one linear field of view is set to extend in a substantially horizontal direction with respect to the occupant, the occupant discrimination processor determining a distribution of distances measured at a predetermined position of the at least one linear field of view, and then determining the posture of the occupant by comparing the pattern of the distance distribution with a group of the model patterns of distance distributions that is preliminarily selected depending upon the distribution of distances.

In the apparatus as described above, the posture of the occupant may be normally determined based on the distribution of distances measured at the predetermined position of the at least one linear field of view. Upon occurrence of a collision, a process of determining the posture of the occupant based on at least the distribution of distances may be performed before other non-emergent processes.

In the apparatus as described above, the predetermined position may be a center position, as viewed in a lateral direction, of an occupant who sits in a normal posture.

According to the fifth aspect of the present invention, there is provided an apparatus for determining an occupant's posture, comprising: a sensor having at least one pair of linear photosensor arrays each comprising a plurality of photosensor elements, the sensor forming an image of an occupant; a distance measurement processor that derives a distance distribution in each of at least one linear field of view that is monitored by the at least one pair of linear photosensor arrays, from the image of the occupant formed by the sensor; and an occupant discrimination processor that compares a pattern of the distance distribution with a plurality of model patterns of distance distributions that are preliminary stored in the occupant discrimination processor, so as to determine the presence and posture of the occupant; wherein the above-indicated at least one linear field of view is set to extend in a substantially horizontal direction with respect to the occupant, the occupant discrimination processor determining the posture of the occupant based on an overall judgment on symmetry of the pattern of the distance distribution in each of the at least one linear field of view, a concave or convex shape of the pattern of the distance distribution, a degree of similarity in variations in the pattern of the distance distribution between adjacent ones of the at least one linear field of view, and a distribution of distances measured at a predetermined position of the at least one linear field of view.

According to the sixth aspect of the present invention, there is provided an apparatus for determining an occupant's posture, comprising: a sensor having at least one pair of linear photosensor arrays each comprising a plurality of photosensor elements, the sensor forming an image of an occupant; a distance measurement processor that derives a distance distribution in each of at least one linear field of view that is monitored by the at least one pair of linear photosensor arrays, from the image of the occupant formed by the sensor; and an occupant discrimination processor that compares a pattern of the distance distribution with a plurality of model patterns of distance distributions that are preliminarily stored in the occupant discrimination processor, so as to determine the presence and posture of the occupant; wherein the above-indicated at least one linear field of view is set to extend in a substantially vertical direction with respect to the occupant, the occupant discrimination processor determining a degree of similarity between patterns of distance distributions in a pair of fields of view that are located at substantially symmetrical positions with respect to an axis of inflation of an air bag, and then determine the posture of the occupant by comparing the pattern of the distance distribution with a group of the model patterns of distance distributions that is preliminarily selected depending upon the degree of similarity.

In the apparatus as described above, the degree of similarity between the patterns of distance distributions in the pair of fields of view may be determined by comparing each of differences in distances measured at corresponding positions in the pair of fields of view with a predetermined value, or comparing an integral value of the differences with a predetermined value.

According to the seventh aspect of the present invention, there is provided an apparatus for determining an occupant's posture, comprising: a sensor having at least one pair of linear photosensor arrays each comprising a plurality of photosensor elements, the sensor forming an image of an occupant; a distance measurement processor that derives a distance distribution in each of at least one linear field of view that is monitored by the at least one pair of linear photosensor arrays, from the image of the occupant formed by the sensor; and an occupant discrimination processor that compares a pattern of the distance distribution with a plurality of model patterns of distance distributions that are preliminarily stored in the occupant discrimination processor, so as to determine the presence and posture of the occupant; wherein the above-indicated at least one linear field of view is set to extend in a substantially vertical direction with respect to the occupant, the occupant discrimination processor normally determining a general posture of the occupant by deriving only a distance distribution in a field of view that is associated with an axis of inflation of an air bag, a process of determining the posture of the occupant including determination of the general posture being performed before other non-emergent processes upon occurrence of a collision.

According to the eighth aspect of the invention, there is provided an apparatus for determining a posture of an occupant, which is used with an air bag system comprising an air bag that is contained in a storage portion provided in the vicinity of a seat of a motor vehicle, and a sensor that detects a shock on the motor vehicle, to cause the air bag to be inflated, the apparatus comprising: a distance sensor having at least one pair of sensor arrays, and providing distance distributions at a plurality of portions of the occupant or an object that is located in a space between the storage portion containing the air bag and the seat; and a processor that determines the posture of the occupant or a shape of the object by comparing patterns of the distance distributions with a plurality of model patterns of distance distributions, thereby to control inflation of the air bag or determine whether the air bag is to be inflated or not, depending upon the posture of the occupant or the shape of the object.

BRIEF DESCRIPTION OF THE DRAWINGS

The invention will be described in greater detail with reference to preferred embodiments thereof and the accompanying drawings, wherein:

FIG. 18 is a first explanatory view showing the relationship among a vehicle seat, occupant's posture, and vertical fields of view;

FIG. 19 is a second explanatory view showing the relationship among a vehicle seat, occupant's posture, and vertical fields of view;

DETAILED DESCRIPTION OF THE PREFERRED EMBODIMENT(S)

Figure 1:
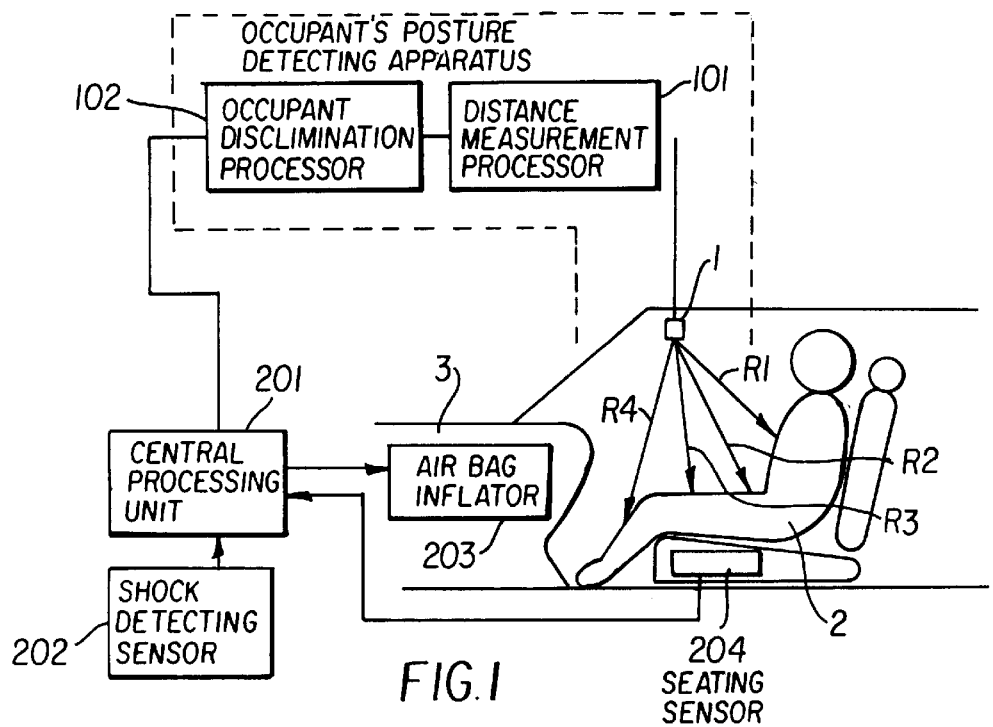
FIG. 1 is a schematic diagram showing the whole construction of an apparatus to which the present invention is applied.

FIG. 1 is a schematic diagram showing the construction of an apparatus as a whole to which the present invention is applied.

More specifically, an occupant sensor 1 is provided at a central portion of the ceiling of the automobile 3, and the apparatus for determining the occupant's posture according to the present invention is constituted by the occupant sensor 1, distance measurement processor 101 and occupant discrimination processor 102 which are connected to the output terminal of the occupant sensor 1. Reference numeral 2 denotes an occupant.

In operation, an image of the occupant 2 is formed by an occupant sensor 1, which defines four linear fields of view R1, R2, R3, R4 with respect to the occupant 2, for example, and generates output signals representing a plurality of portions of the occupant 2 located in the respective fields of view. The distance measurement processor 101 process the output signals of the occupant sensor 1 to provide patterns of distance distributions, which are then compared with model patterns preliminarily stored in the occupant discrimination processor 102, so that not only the presence of the occupant but also his/her posture can be determined by the processor 102.

A central processing unit 201 receives a signal indicative of the posture of the occupant determined by the occupant discrimination processor 102, along with an output signal of a seating sensor 204 that determines whether an occupant is seated or not, for example. When a shock detecting sensor 202 detects a shock, the central processing unit 201 determines whether it generates a command to inflate an air bag, based on information on the occupant's posture immediately before detection of the shock, and information from the seating sensor 204 as to whether the occupant is seated or not. The central processing unit 201 then generates the command to an inflator 203 that starts inflating an air bag contained in a storage portion provided in the vicinity of the vehicle seat.

Figure 2:
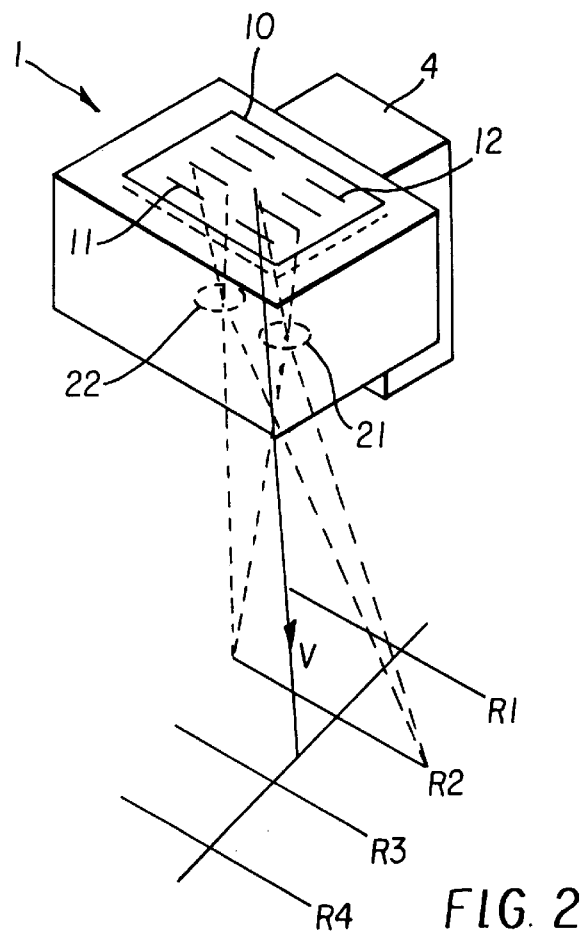
FIG. 2 is a view explaining the relationship between photosensor arrays used in the apparatus of FIG. 1 and fields of view.

FIG. 2 shows one example of the occupant sensor 1 used in the apparatus of FIG. 1.

In this example, the occupant sensor 1 is constructed by integrating a multistage photoresponsive IC 10 comprised of four pairs of photosensor arrays, with imaging lenses 21, 22. Although at least one pair of photosensor arrays may suffice, a four-stage arrangement consisting of four pairs of photosensor arrays is employed in this example, so as to define a plurality of (four) linear fields of view R1, R2, R3 and R4. In FIG. 2, reference numeral 4 denotes an auxiliary light source, and V denotes a direction in which the sensor is oriented toward the center of the field of views.

Figure 3:
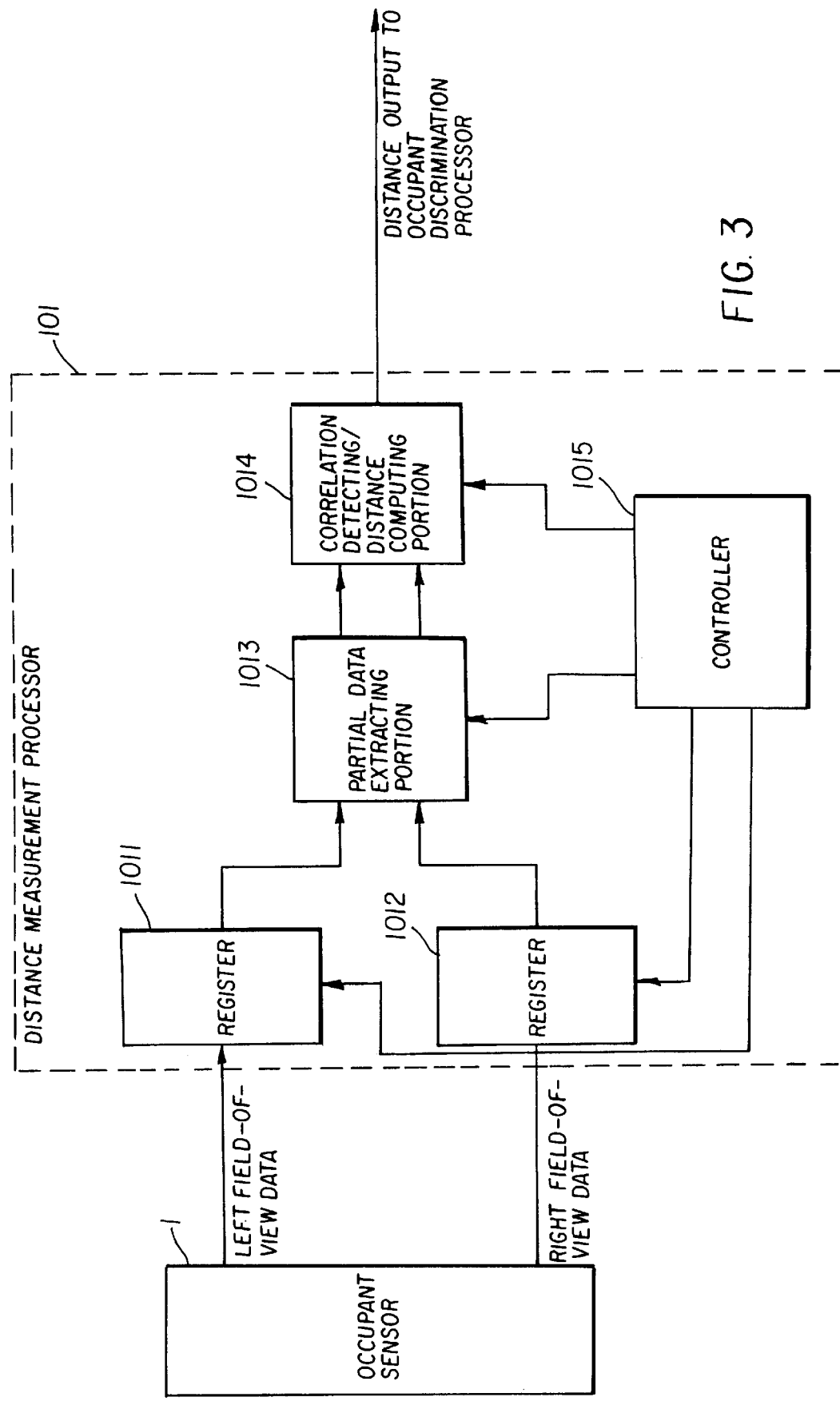
FIG. 3 is a block diagram showing an example of a distance measurement processor of the apparatus of FIG. 1.

FIG. 3 shows a specific example of the distance measurement processor 101.

The distance measurement processor 101 includes registers 1011, 1012 that serve as memories, partial data extracting portion 1013, correlation detecting/distance computing portion 1014, a controller 1015 for controlling these elements 1011–1014, and others. A method for measuring distances by the distance measurement processor 101 will be explained below. Initially, the principle of measurement of distances will be explained with reference to FIG. 4.

Figure 4:
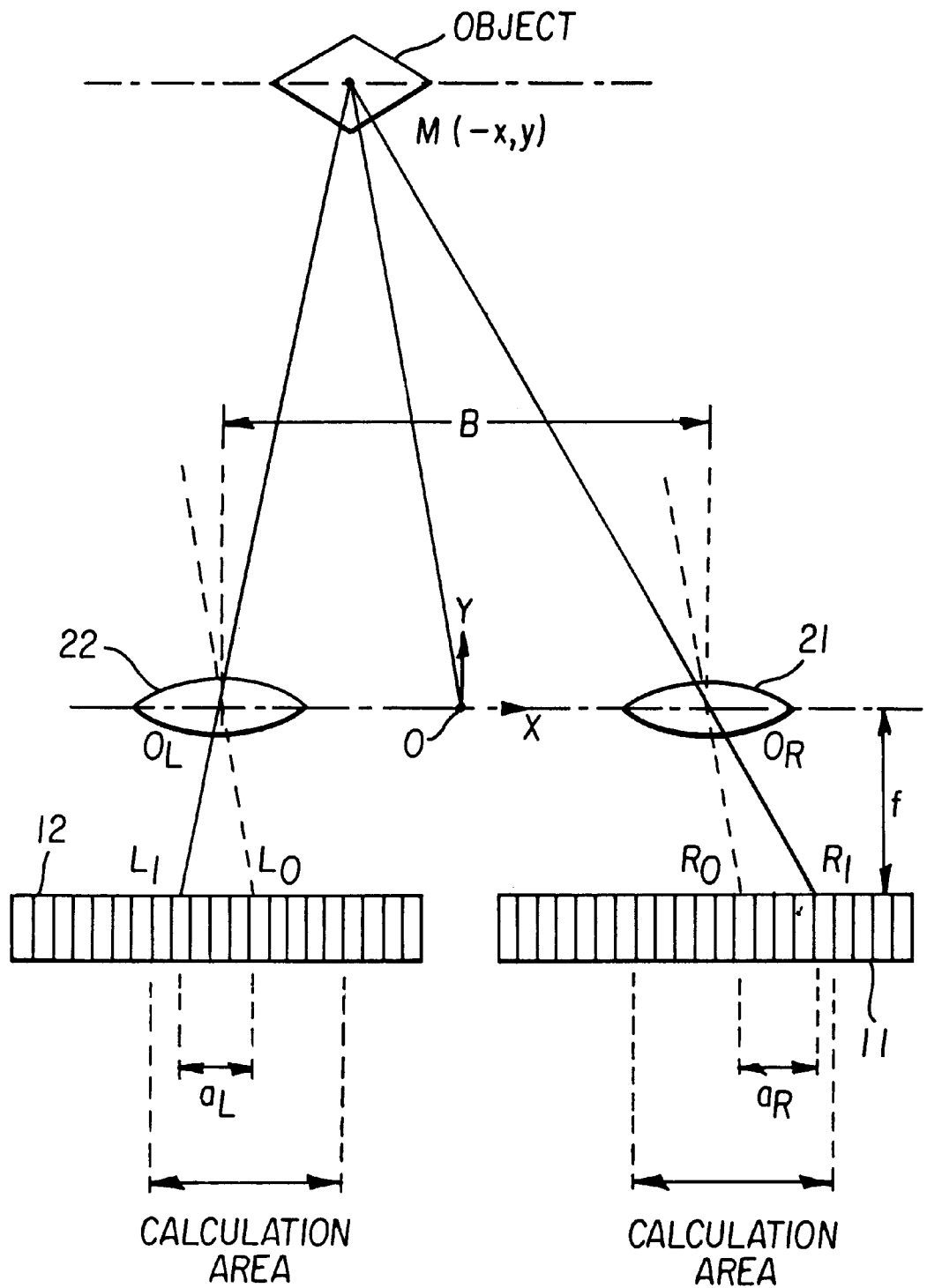
FIG. 4 is a view explaining a method of measuring distances.

As shown in FIG. 4, the horizontal axis X and vertical axis Y are plotted with respect to the origin O located at the center of the imaging lenses 21, 22, and the focal points of these lenses 21, 22 are defined as $R_1$ and $L_1$, respectively. The coordinates of the center point $O_L$ of the imaging lens 22 are $(-B/2, 0)$, and the coordinates of the center point $O_R$ of the imaging lens 21 are $(B/2, 0)$, where B represents distance between the center points of the lenses 21, 22. In FIG. 4, $(-x, y)$ represent coordinates of a point M on an object (subject), and "$L_0$" represents the position at which a straight line that passes through point $O_L$ and extends in parallel with straight line MO intersects with the photosensor array 12, while "$R_0$" represents the position at which a straight line that passes through point $O_R$ and extends in parallel with the line MO intersects with the photosensor array 11.

In FIG. 4, "$a_L$" represents distance between point "$L_0$" and point "$L_1$", and "$a_R$" represents distance between point "$R_0$" and point "$R_1$". "$L_0$", "$R_0$" constitute reference positions based on which "$a_L$" and "$a_R$" are obtained. Since $\Delta MO_L O$ and $\Delta O_L L_1 L_0$ are similar to each other, and $\Delta MO_R O$ and $\Delta O_R R_1 R_0$ are similar to each other, the following equations (1), (2) are established:

$$(-x+B/2)f = a_L \cdot y \tag{1}$$

$$(x+B/2)f = a_R \cdot y \qquad (2).$$

By eliminating x from the above equations (1), (2), the following expression:

$$y = B \cdot f/(a_L + a_R) \qquad (3)$$

is obtained. Since $a_L + a_R = p \cdot x$ where "p" represents a pitch of the sensors, and "x" represents the number of the sensors, "y" may also be expressed by the following equation:

$$y = B \cdot f/(p \cdot x) \qquad (4)$$

If the distance "$a_L$" between the focal position $L_1$ of the left photosensor array 12 and the point $L_0$ and the distance "$a_R$" between the focal position $R_1$ of the right photosensor array 11 and the point $R_0$ are known, the distance "y" from the origin to the object can be calculated according to the equation (3). The principle of measuring distances itself is known in the art.

To determine the relative positions or displacement of two images obtained in the manner as described above, the distance measurement processor 101 performs correlating calculation as described below.

Output signals of respective elements of both of the photosensor arrays 11, 12 are converted into 8-bit digital signals, for example, which are then stored in the registers 1011, 1012 shown in FIG. 3 that serve as memories, and the partial data extracting portion 1013 selects one pair of calculation areas 111, 112 from the data stored in the registers 1011, 1012. Each of the calculation areas 111, 112 consists of quantized data $A_1-A_n$, $B_1-B_n$, as shown in FIG. 5, which are produced by n pieces of elements of each photosensor array.

Figure 5:
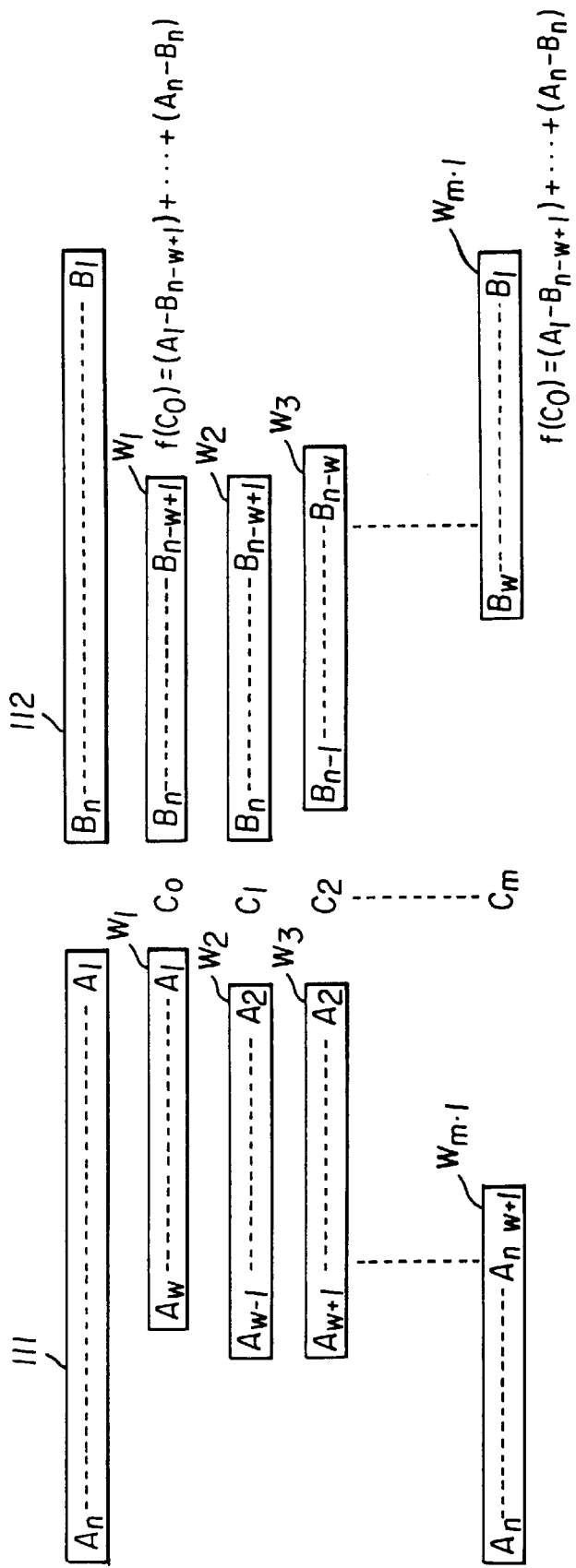
FIG. 5 is a view explaining correlating calculation in the method of measuring distances.

To obtain the index ($a_L + a_R$) of the distance from the front face of the sensor to the object that forms a certain angle with respect to the front face (which angle is formed by the Y-axis and line MO connecting a point M on the object with the origin O in FIG. 4), the correlation detecting/distance computing portion 1014 shown in FIG. 3 sets windows $W_1-W_{m+1}$ having a certain size as shown in FIG. 5, with respect to each set of quantized data as described above, so as to provide subsets $C_0-C_{m+1}$ having (m+1) pairs of windows which are alternately shifted by one sensor unit (1 bit). Then, a correlating function f(CO)–f(Cm) for each of the subsets $C_0-C_{m+1}$ (or each pair of windows) is established such that the function consists of the sum of absolute values of differences between corresponding quantized data, and the subset or combination $C_k$ in which the correlating function gives the minimum value is obtained. The degree of shift of left and right images (or correlation between the two images) can be thus calculated from the value of the subscript "k". In this manner, the distance index that is proportional to ($a_L + a_R$) as indicated in the above equation (3) is obtained. (Refer to Japanese Patent No. 2676985, corresponding U.S. Pat. No. 5,602,944 and corresponding German Patent No. 4121145.)

Figure 6:
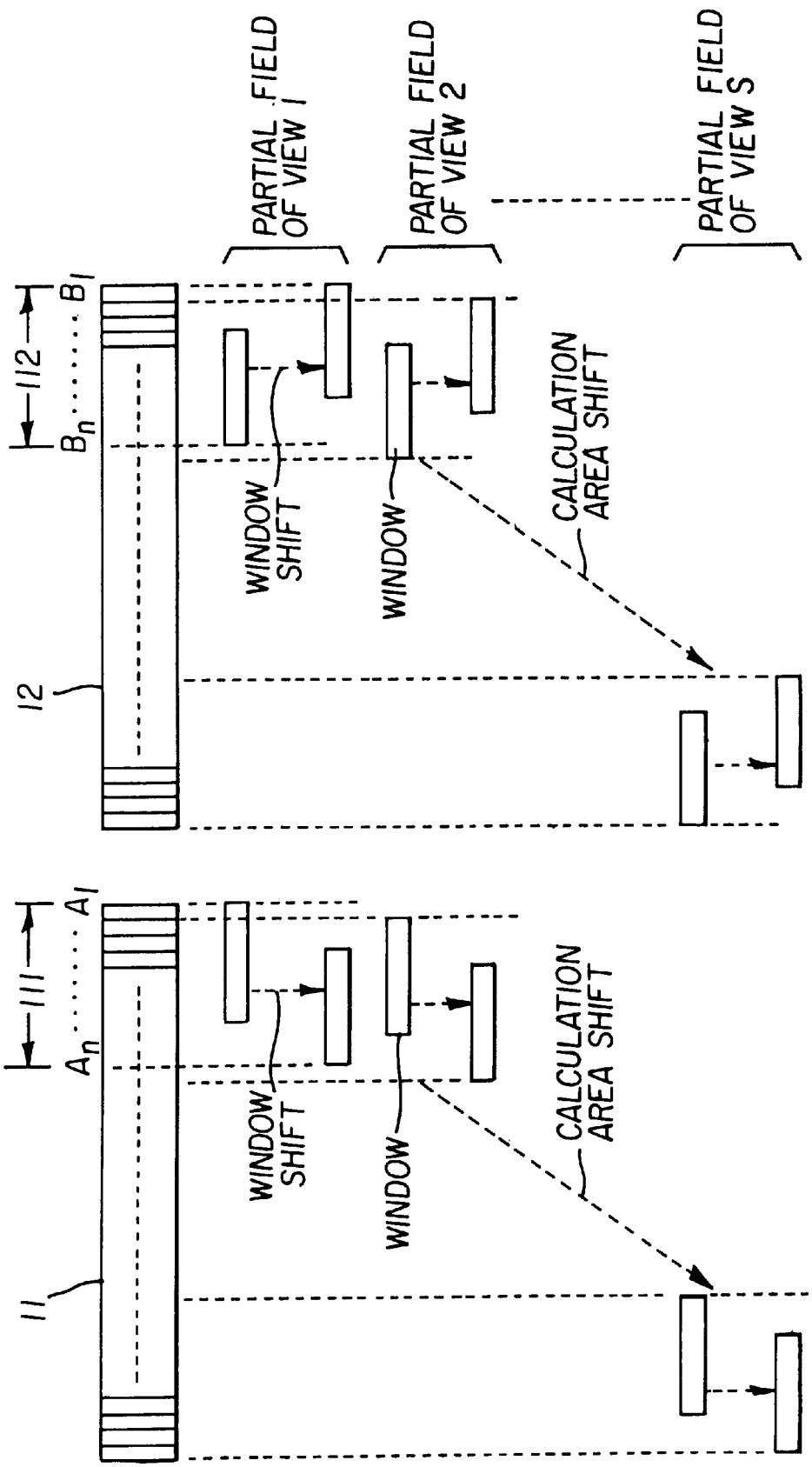
FIG. 6 is a view explaining a method of measuring distances at multiple points.

If the above-described process for obtaining the distance index is performed for each pair of calculation areas 111, 112, while sequentially shifting the calculation areas 111, 112 by one bit (one pitch: p) at a time as shown in FIG. 6, s pieces of discrete distance data can be obtained from the first to s-th pairs of calculation areas.

Figure 7:
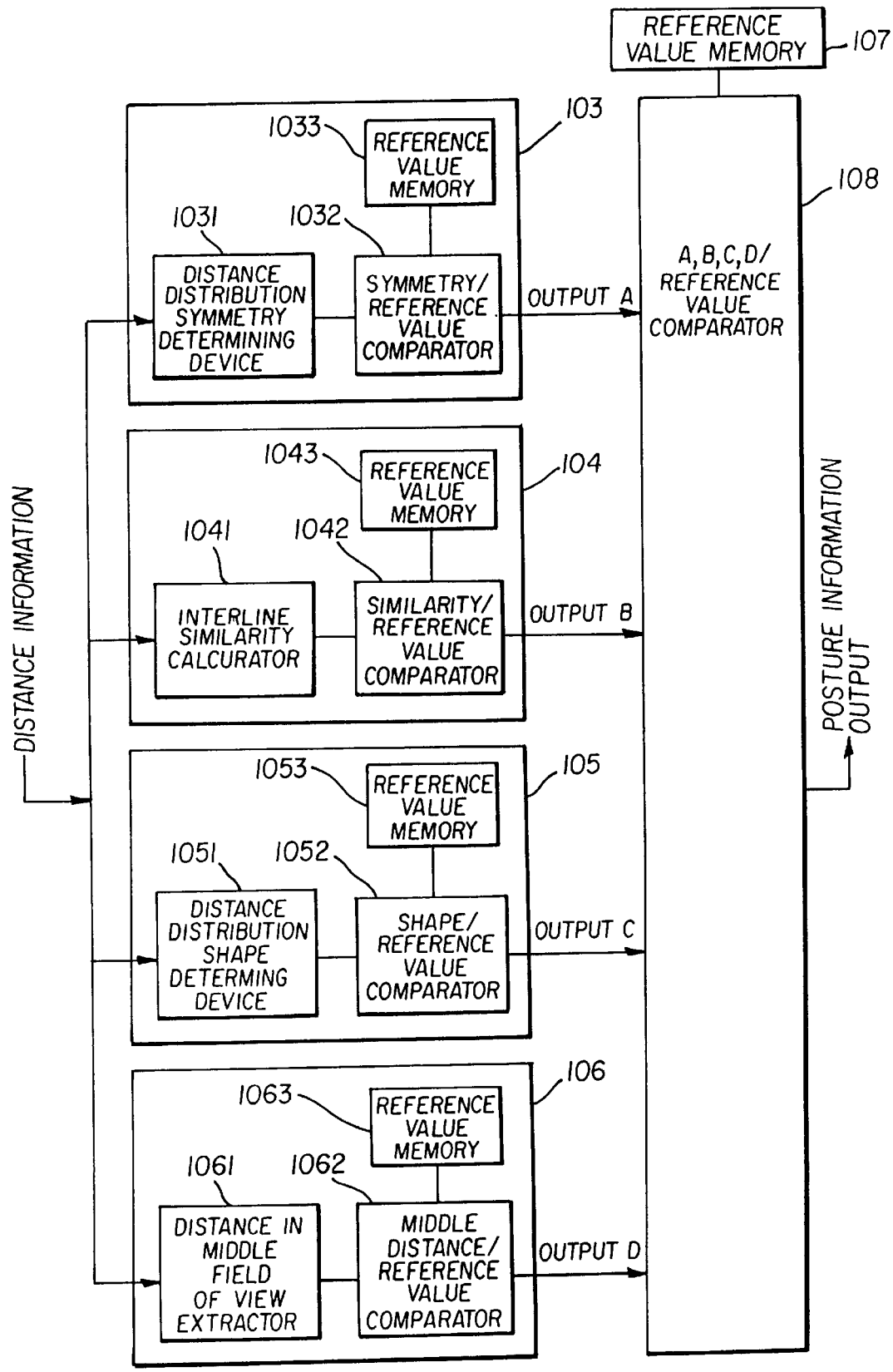
FIG. 7 is a block diagram showing an occupant discrimination processor of the apparatus of FIG. 1.

FIG. 7 is a block diagram showing a specific example of the occupant discrimination processor 102. The occupant discrimination processor 102 of this embodiment consists of four discriminating portions 103–106 for selecting a narrower range of model patterns to be compared with a pattern of distance distribution in question, according to different discriminating algorithms, a reference value memory 107 that stores a plurality of model patterns each defining a particular posture of an occupant or a shape of an object, for comparison with any combination of output values A–D of the discriminating portions 103–106, and a comparator 108 that compares a combination of the outputs A–D of the discriminating portions 103–106 with data stored in the reference value memory 106 for pattern matching, and generates the result of pattern matching. Where the occupant discriminating processor 102 including these discriminating portions 103–106 is used, a plurality of linear fields of view monitored by the photosensor arrays 12 of the occupant sensor 1 are set or defined in substantially horizontal directions with respect to the occupant 2.

The discriminating portion 103 includes a distance distribution symmetry determining device 1031, reference value memory 1033, and a symmetry/reference value comparator 1032. The distance distribution symmetry determining device 1031 receives information on distances within each of the linear fields of view R1, R2, R3, and R4, detects the presence of lateral symmetry in the distance distribution with respect to each of the linear fields of view, and then outputs the results on the lateral symmetry in the plural fields of view R1, R2, R3, and R4, in the order of R1, R2, R3, R4. For instance, the results obtained by the determining device 1031 may be patterned or coded into "0110" (where "0" represents the presence of symmetry, and "1" represents the absence of symmetry), and generated in this form. On the other hand, the reference value memory 1033 preliminarily stores a plurality of model symmetry patterns associated with various postures or shapes of occupants or objects. The symmetry/reference value comparator 1032 compares the output of the distance distribution symmetry determining device 1031 with the plurality of model symmetry patterns stored in the reference value memory 1033, and generates to the comparator 108 an output A that represents the result of of selection of a narrow range of model patterns on postures or shapes of occupants or objects. In the following description, the algorithm used by the discriminating portion 103 will be called "determination on the lateral symmetry of distance distribution (first embodiment)".

The discriminating portion 104 includes a line similarity calculator 1041, reference value memory 1043, and a similarity/reference value comparator 1042. The line similarity calculator 1041 receives information on distances within each of the linear fields of view R1, R2, R3, and R4, detects a degree of similarity between adjacent linear fields of view, namely, between (1) R1 and R2, (2) R2 and R3, and (3) R3 and R4, in terms of variations in the distance distribution within each field of view, and outputs the results in the order of (1), (2) and (3). For instance, the results obtained by the determining device 1041 may be patterned or coded into "1001" (where "0" represents the presence of symmetry, and "1" represents the absence of symmetry) and generated in this form. On the other hand, the reference value memory 1043 preliminarily stores a plurality of model similarity patterns associated with various postures of occupants or shapes of objects. The similarity/reference value comparator 1042 compares the output of the line similarity determining device 1041 with the plurality of model similarity patterns stored in the reference value memory 1043, and generates to the comparator 108 an output B that represents the result of selection of a narrow range of model patterns on postures or shapes of occupants or objects. In the following description, the algorithm used by the discriminating portion 104 will be called "determination on the similarity between adjacent lines (second embodiment)".

The discriminating portion 105 includes a distance distribution concave/convex shape determining device 1051, reference value memory 1053, and a concave/convex shape/ reference value comparator 1052. The distance distribution concave/convex shape determining device 1051 receives information on distances within each of the linear fields of view R1, R2, R3, and R4, detects any concavity or convexity in distance distribution with respect to each linear field of view, based on the distance distribution between first position and second position in the field of view on the opposite sides of the central position of the field of view, and outputs results on the concavity or convexity in the plurality of fields of view R1, R2, R3, R4, in the order of R1, R2, R3, R4. For example, the results obtained by the determining device 1051 may be patterned or coded into "0120" (where "0" represents flat shape, "1" represents convex shape, and "2" represents concave shape). On the other hand, the reference value memory 1053 preliminarily stores a plurality of model concave/convex patterns associated with respective postures of occupants and respective shapes of objects. The convex/ concave shape/reference value comparator 1052 compares the output of the distance distribution concave/convex shape determining device 1051 with the plurality of standard concave/convex patterns stored in the reference value memory 1053, and generates to the comparator 108 an output C that represents the result of selection of a narrow range of model patterns on postures or shapes of occupants or objects. In the following description, the algorithm used by the discriminating portion 105 will be called "determination on the concavity/convexity (third embodiment)".

The discriminating portion 106 includes an extractor 1061 for extracting distances at the middle positions of the fields of view, reference value memory 1063, and a middle distance/reference value comparator 1062. The extractor 1061 receives information on distances within each of the linear fields of view R1, R2, R3, and R4, detects an increase or decrease in the distance value at the middle position of each field of view, as compared with that of an adjacent field of view, and outputs results on the distance increase or decrease in each field of view R1, R2, R3, R4, in the order of R1, R2, R3, R4. For example, the results obtained by the extractor 1061 may be patterned or coded into "+, −, −, −" (where "=" represents increase, and "−" represents decrease). On the other hand, the reference value memory 1063 preliminarily stores a plurality of model increase/ decrease patterns that are associated with various postures of occupants or shapes of objects. The middle distance/ reference value comparator 1062 compares the output of the extractor 1061 with the plurality of model increase/decrease patterns stored in the reference value memory 1063, and generates to the comparator 108 an output D that represents the result of selection of a narrow range of model patterns on postures or shapes of occupants or objects. In the following description, the algorithm used by the discriminating portion 106 will be called "determination on increases/decreases of distances between lines (fourth embodiment)".

The comparator 108 that receives different outputs A–D from the discriminating portions 103–106 as described above initially receives the output D of the discriminating portion 106 as a result of "determination on increases/ decreases of distances between lines", and compares a characteristic pattern of the output D with model patterns stored in the reference value memory 107, so as to produce a group of model patterns that coincide with the characteristic pattern. If a particular occupant's posture or object's shape can be specified from this group of model patterns, this data is generated as posture information. If a particular result cannot be obtained only from this output D, and a plurality of model patterns correspond to the characteristic pattern, the corresponding model increase/decrease patterns are classified into one group, and "determination on the concavity and convexity" is made with respect to this group of model patterns. Namely, on the basis of the output C of the discriminating portion 105 as a result of "determination on the concavity and convexity", any model concavity/ convexity pattern that coincides with the concave/convex pattern represented by the output C is extracted from the group of model increase/decrease patterns selected as described above. If a particular model concave/convex pattern is obtained, the occupant's posture or object's shape associated with this pattern is generated as posture information. However, if a particular result still cannot be obtained by "determination on the concavity/convexity", the model convex/concave patterns corresponding to the pattern of the output C are classified into one group, and one particular pattern is extracted from this group, based on the output B of the discriminating portion 104 as a result of "determination on the similarity between lines". If necessary, the output A of the discriminating portion 103 as a result of "determination on the lateral symmetry of distance distribution" may be also used for determining the posture of an occupant.

Figure 28B:
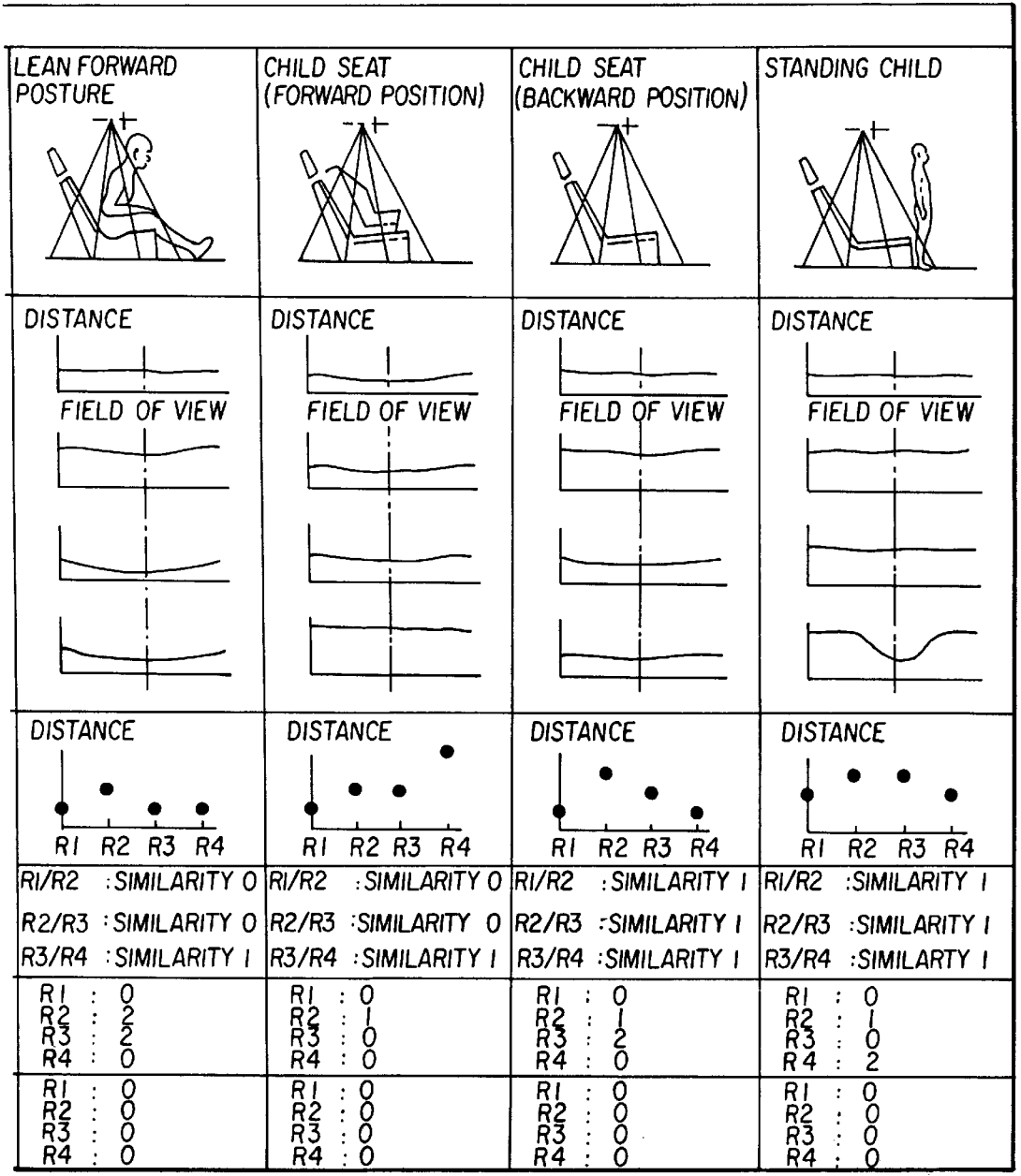
FIG. 28 illustrates the results of discrimination according to four discrimination algorithms.
Figure 28B:
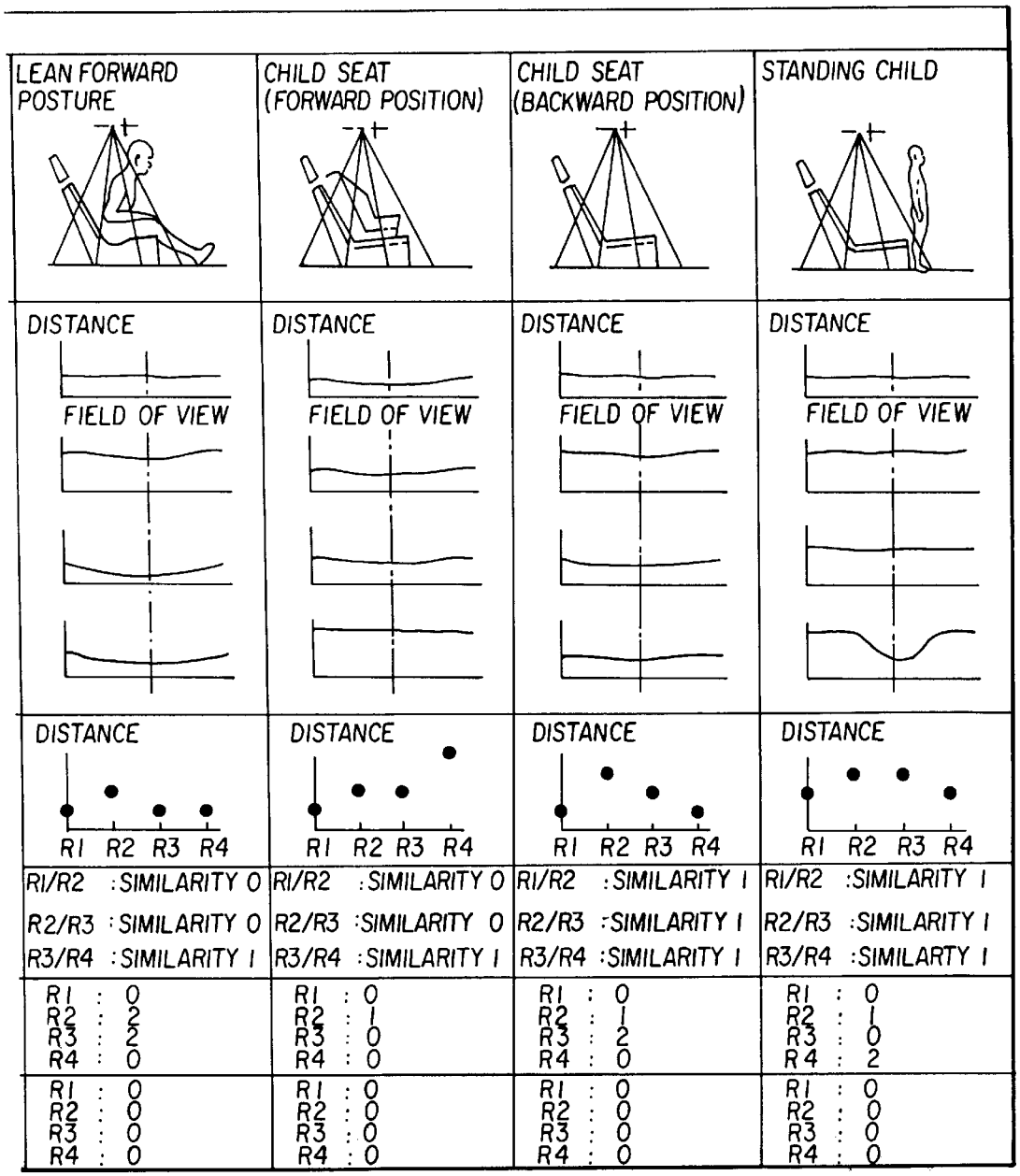
Figure 29B:
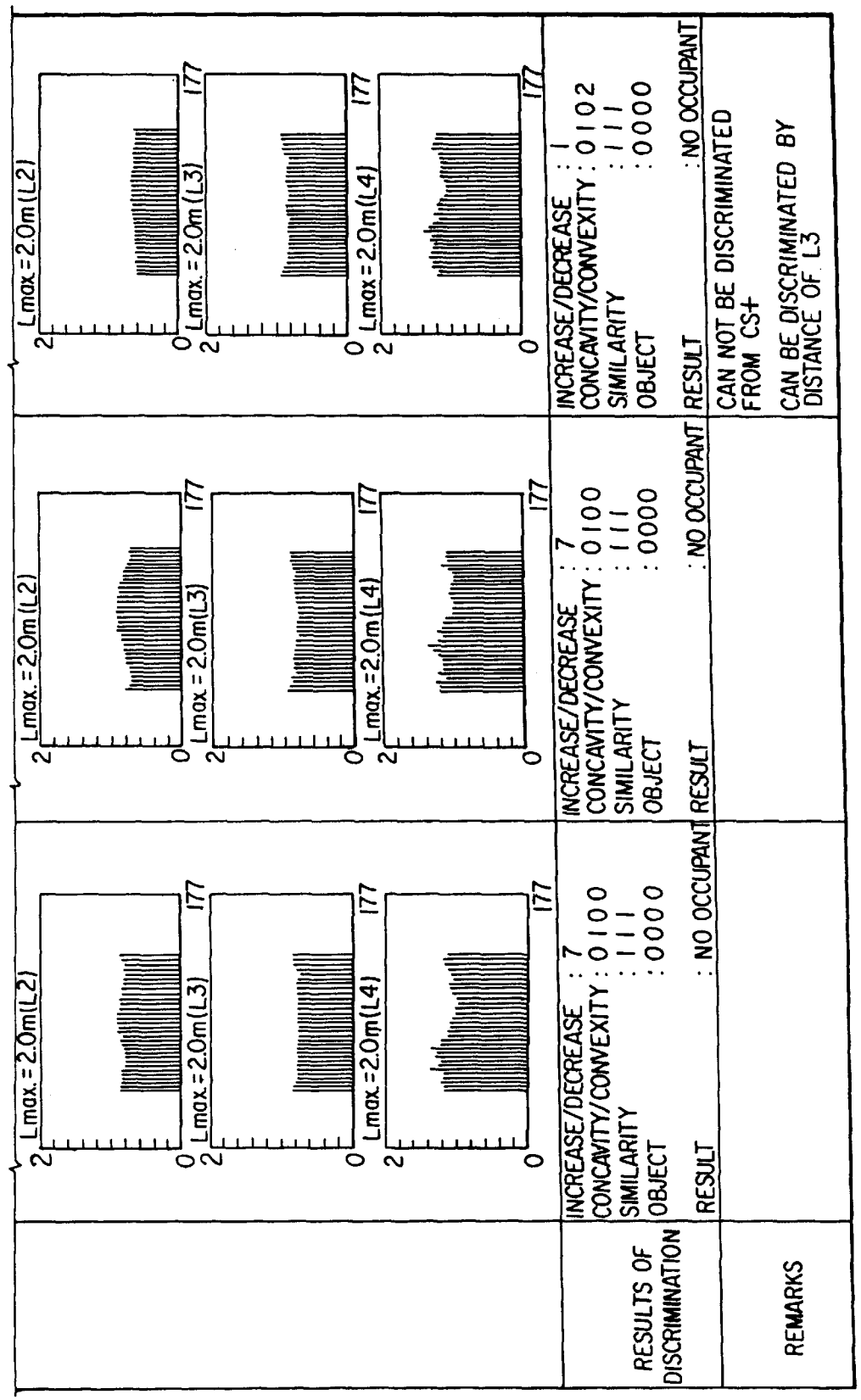
FIGS. 29–34 illustrate differences in the result of discrimination due to changes in seat position.
Figure 30A:
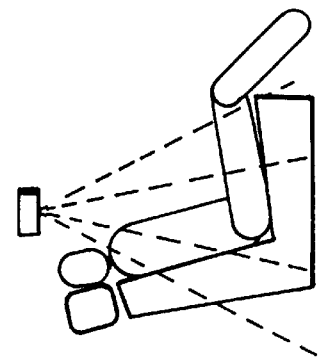
Figure 30B:
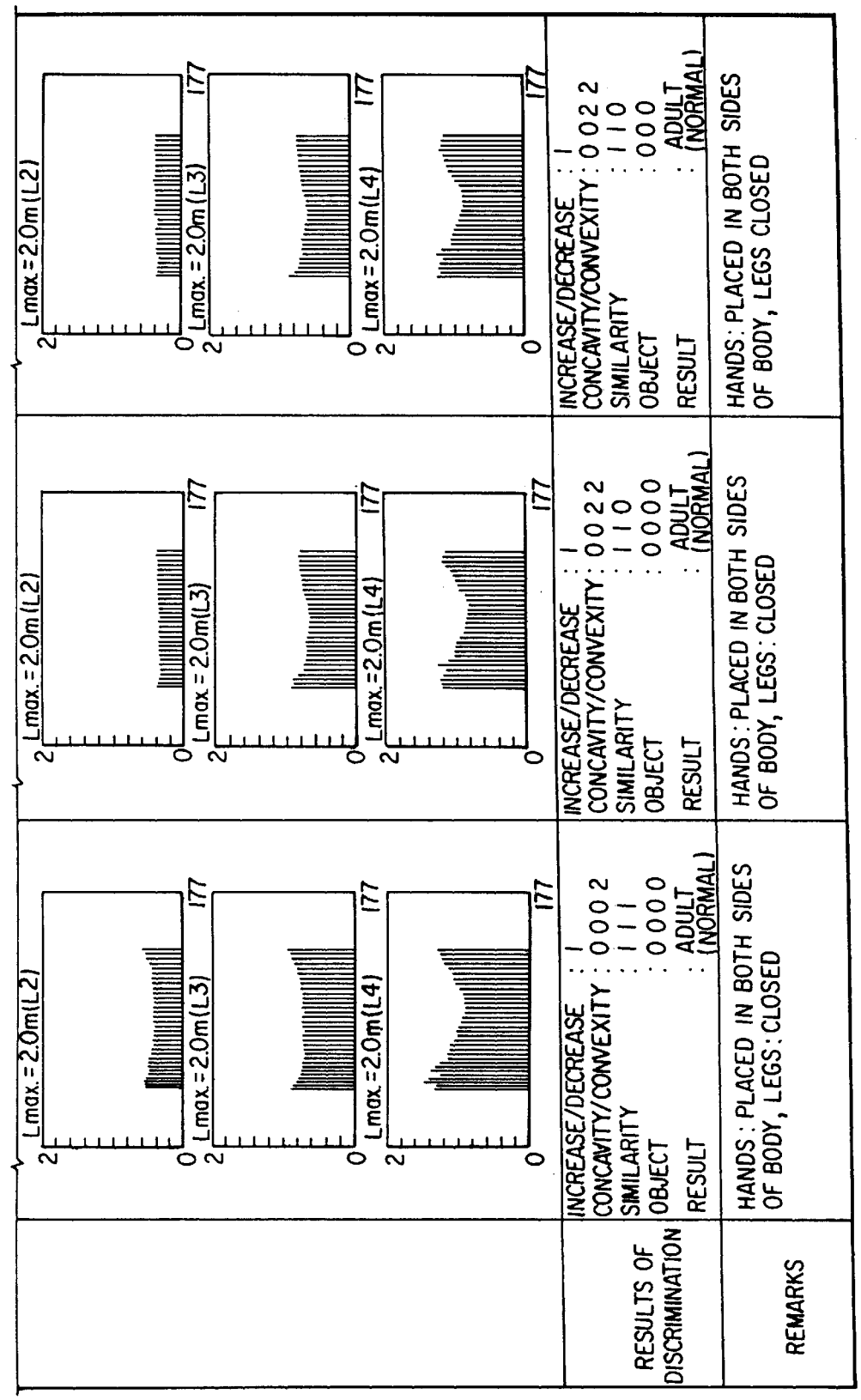
Figure 31B:
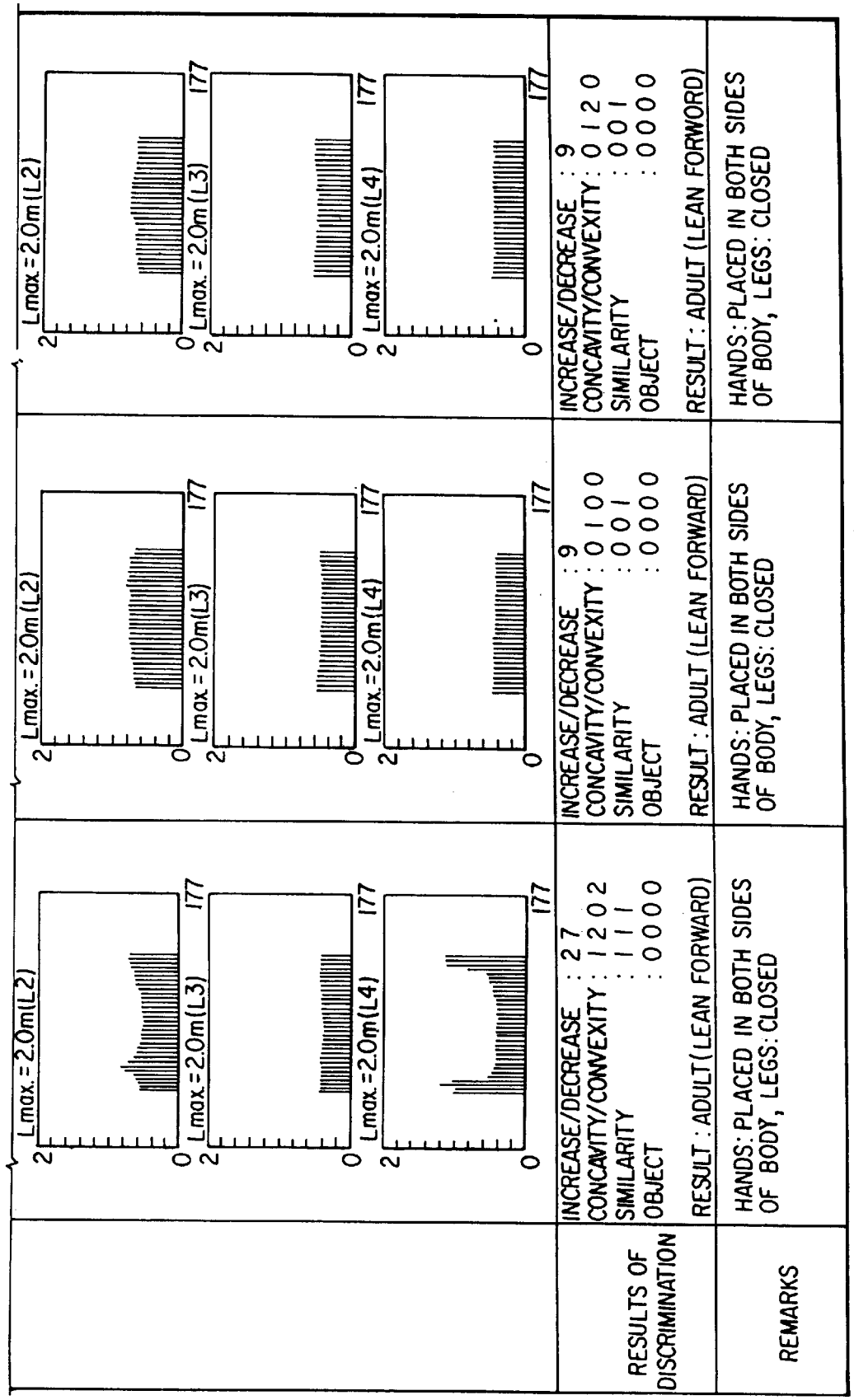
Figure 32:
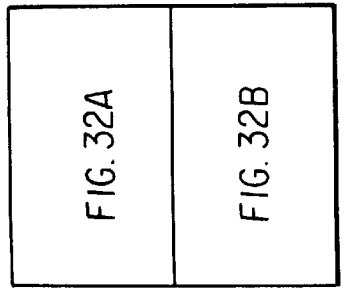
Figure 32A:
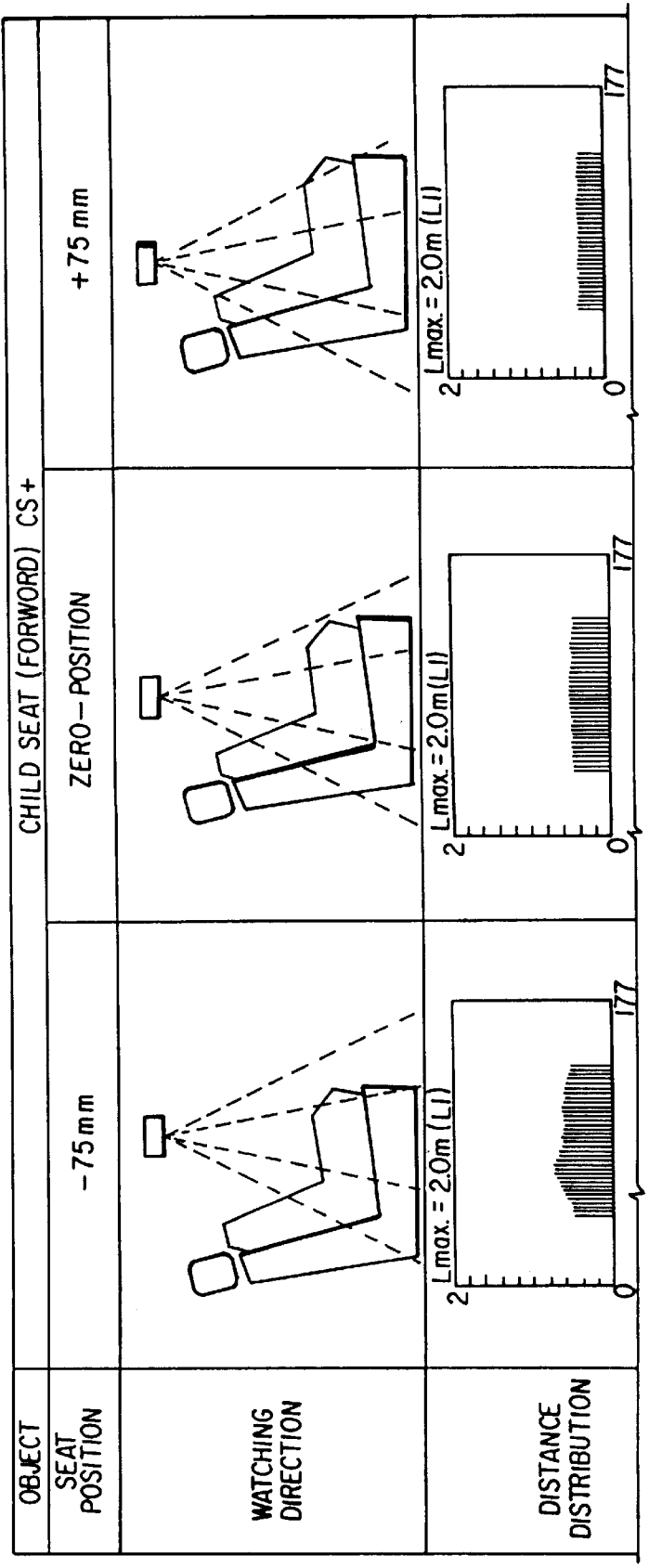
Figure 32B:
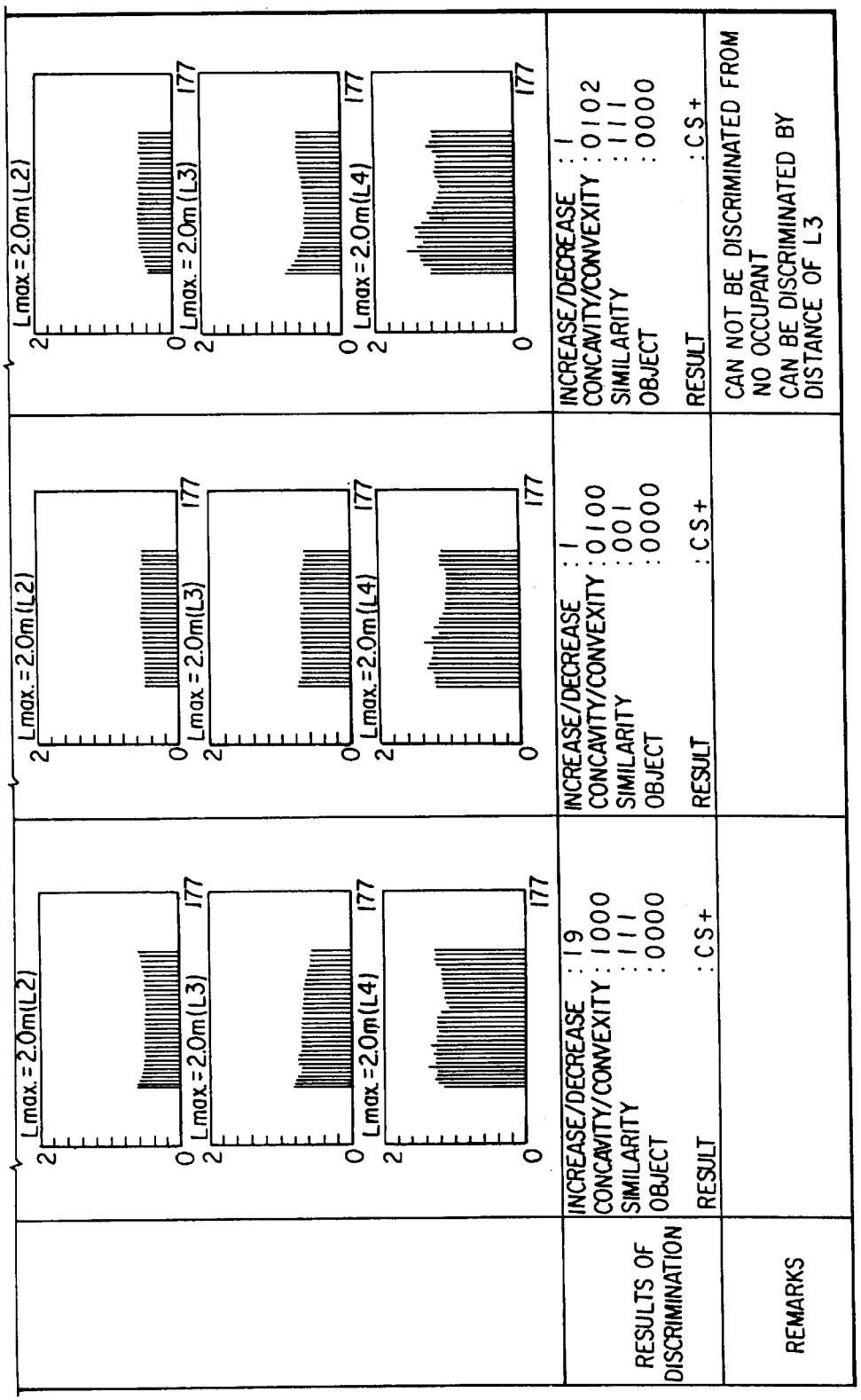
Figure 33B:
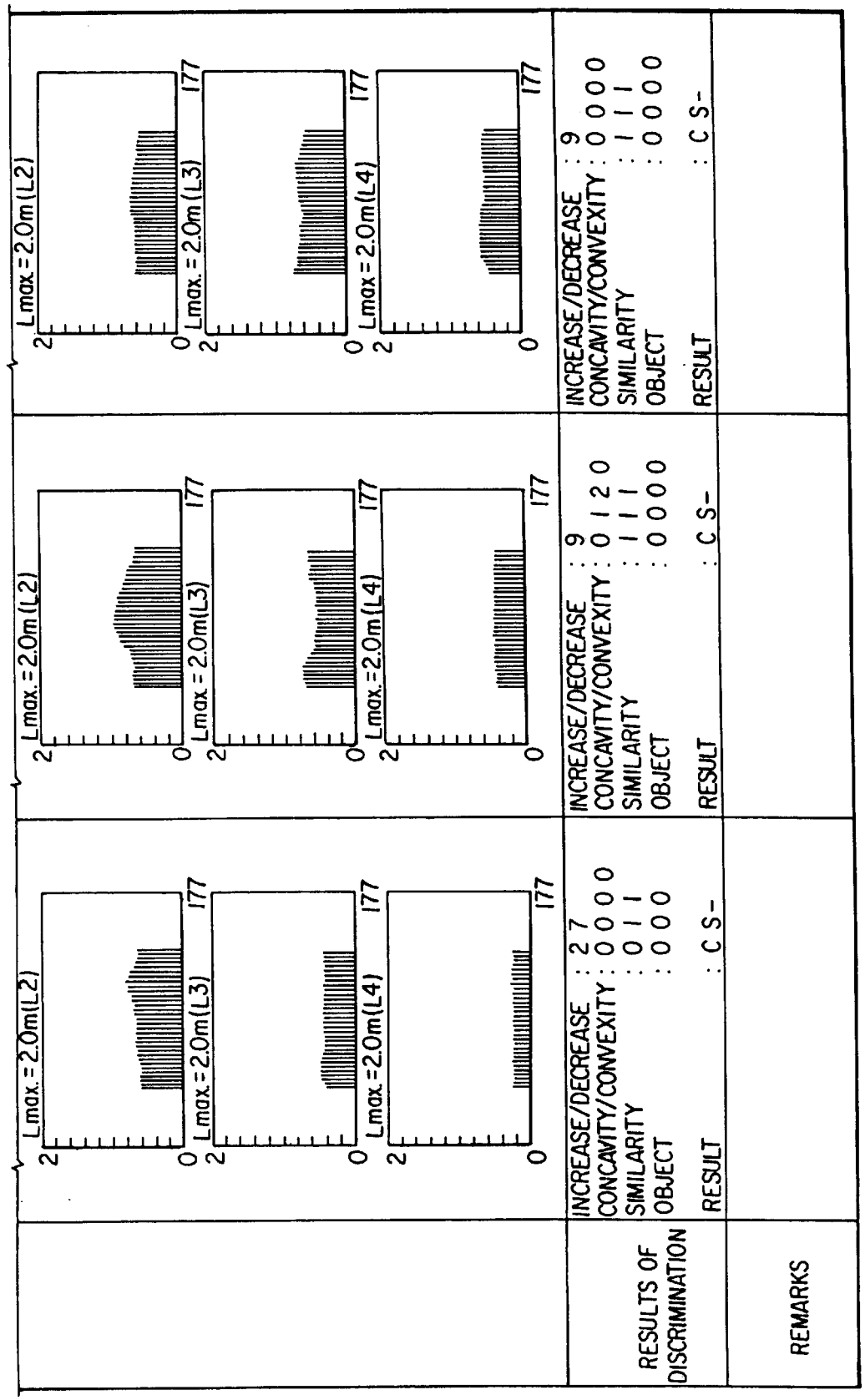
Figure 34A:
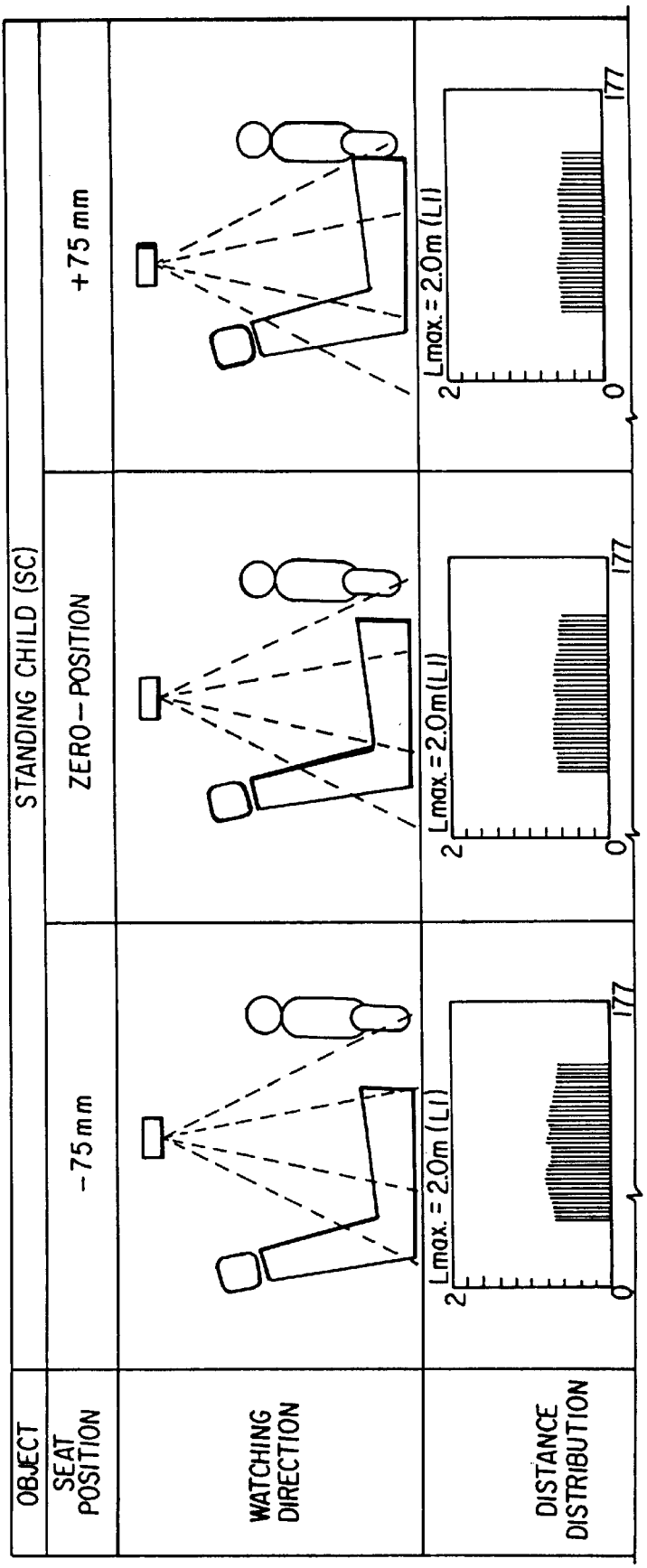
Figure 34B:
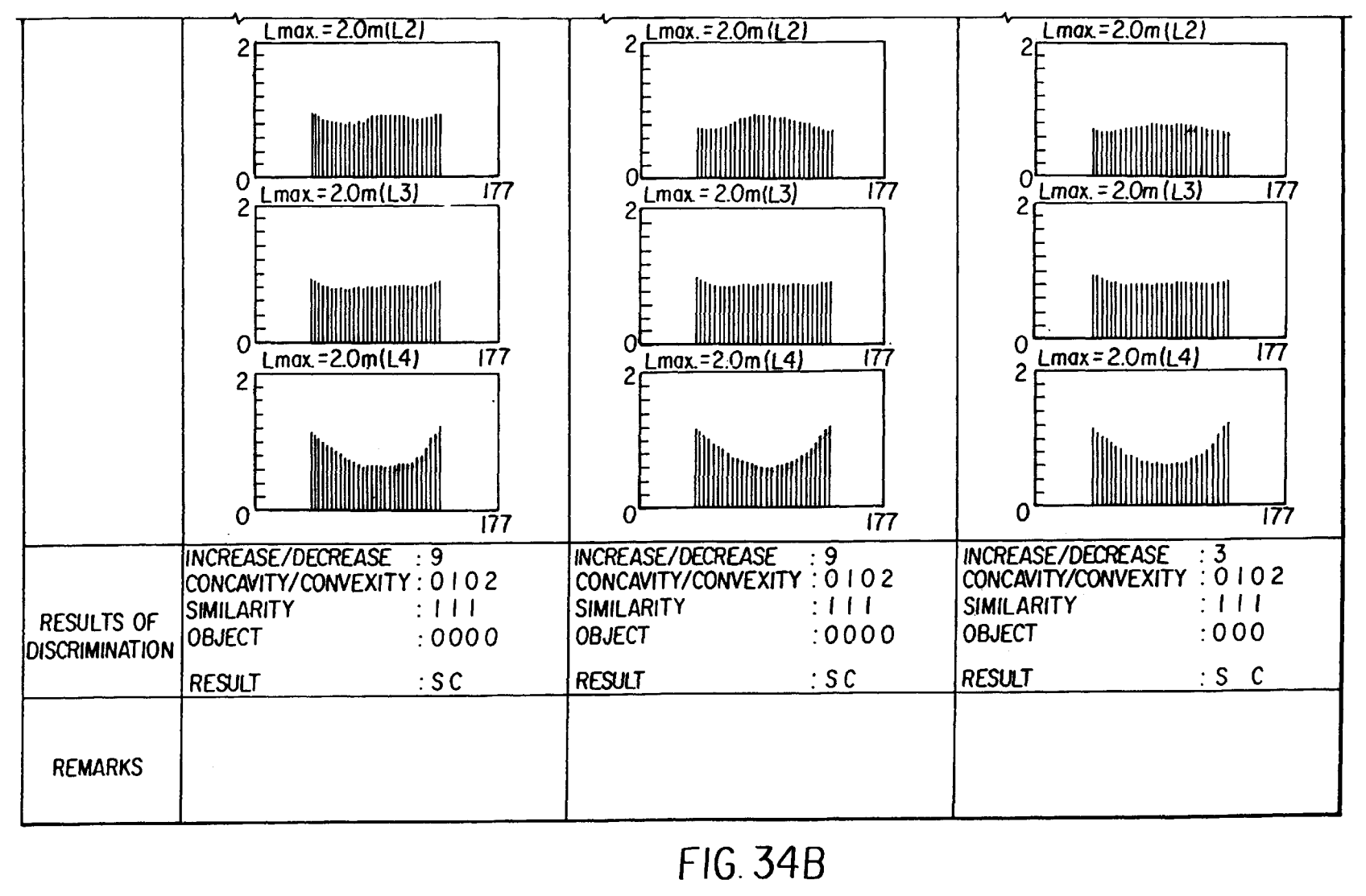

FIG. 28 shows the results of discrimination according to the four discrimination algorithms as described above, in relation with respective postures of occupant or shapes of object. FIG. 29 through FIG. 34 show in detail differences in the results of discrimination due to changes in the seat position. In the case of "adult (lean-forward posture)/seat position: 0", for example, the result of narrowing of increase/decrease patterns is "9" (the meaning of this number will be described later), but the increase/decrease pattern also indicates "9" in the cases of "child seat (backward position)/seat position: 0" shown in FIG. 33 and "standing child/seat position: 0" shown in FIG. 34. It will be thus understood that these three cases cannot be discriminated only by the discriminating portion 106 that makes a "determination on increases/decreases of distances between lines ". Then, if the results of "concavity/convexity determination" made by the discriminating portion 105 with respect to these three cases are taken into consideration, "0100" is obtained as a result of "concavity/convexity determination" in the case of "adult (lean-forward posture)/seat position: 0" of FIG. 31, whereas "0120" and "0102" are respectively obtained as results in the cases of "child seat (backward position)/seat position: 0" of FIG. 33, and "standing child/ seat position: 0" of FIG. 34. It will be thus understood that these three cases can be clearly discriminated from each other. In the meantime, "no occupant/seat position: +75 mm) shown in FIG. 29 and " child seat (forward position)/seat position: +75 mm) shown in FIG. 32 yields the same results in the "determination on increases/decreases of distances between lines" that produces the output D, "concavity/ convexity determination" that produces the output C, "determination on similarity between lines" that produces the output B, and "determination on the lateral symmetry of distance distribution" that produces the output A, and therefore these two cases cannot be discriminated from each other by the four discrimination algorithms. However, these are extremely limited cases, and if necessary, these cases may be discriminated from each other by comparing distance values in the linear field of view R3.

In the above-described embodiment, the comparator 108 initially processes output D as a result of "determination on increases/decreases of distances between lines", and then processes output C as a result of "concavity/convexity determination", output B as a result of "determination on similarity between lines", and output A as result of "determination on the lateral symmetry of distance distribution", in the order of description. However, the comparator 108 may process the outputs A–D in different orders, and in many cases, two outputs are sufficient to specify a particular pattern among others. What is important here is that the "determination on increases/decreases in distance between lines" for producing output D should be made in the first place, and that this "determination on increases/decreases in distance between lines" and at least one of the other three discrimination algorithms should be combined together. From the result of experiments conducted so far, the present inventors have confirmed that the "determination on increases/decreases in distance between lines" made by the discriminating portion 106 is the easiest method to narrow a range of model patterns for pattern matching, when determining or judging the posture of an occupant or the shape of an object, and it is highly effective to reduce the processing time for discrimination.

While the occupant sensor 1 is attached to the ceiling of the automobile, and the fields of view of the sensor 1 are set in horizontal directions with respect to the vehicle seat in the illustrated embodiment, the present invention is not limited to this arrangement. For example, the occupant sensor may be attached to a room mirror located at a front, upper portion as viewed from a driver, or may be attached to a dashboard located in front of a passenger.

Next, the contents of discrimination processes of the respective discriminating portions 103–106 will be more specifically described in detail, in the order of "determination on the lateral symmetry of distance distribution (first embodiment)" made by the discriminating portion 103, "determination on similarity between lines (second embodiment)" made by the discrimination portion 104, "determination on concavity and convexity (third embodiment)" made by the discriminating portion 105, "determination on increases/decreases in distance between lines (fourth embodiment)" made by the discriminating portion 106.

Figure 25:
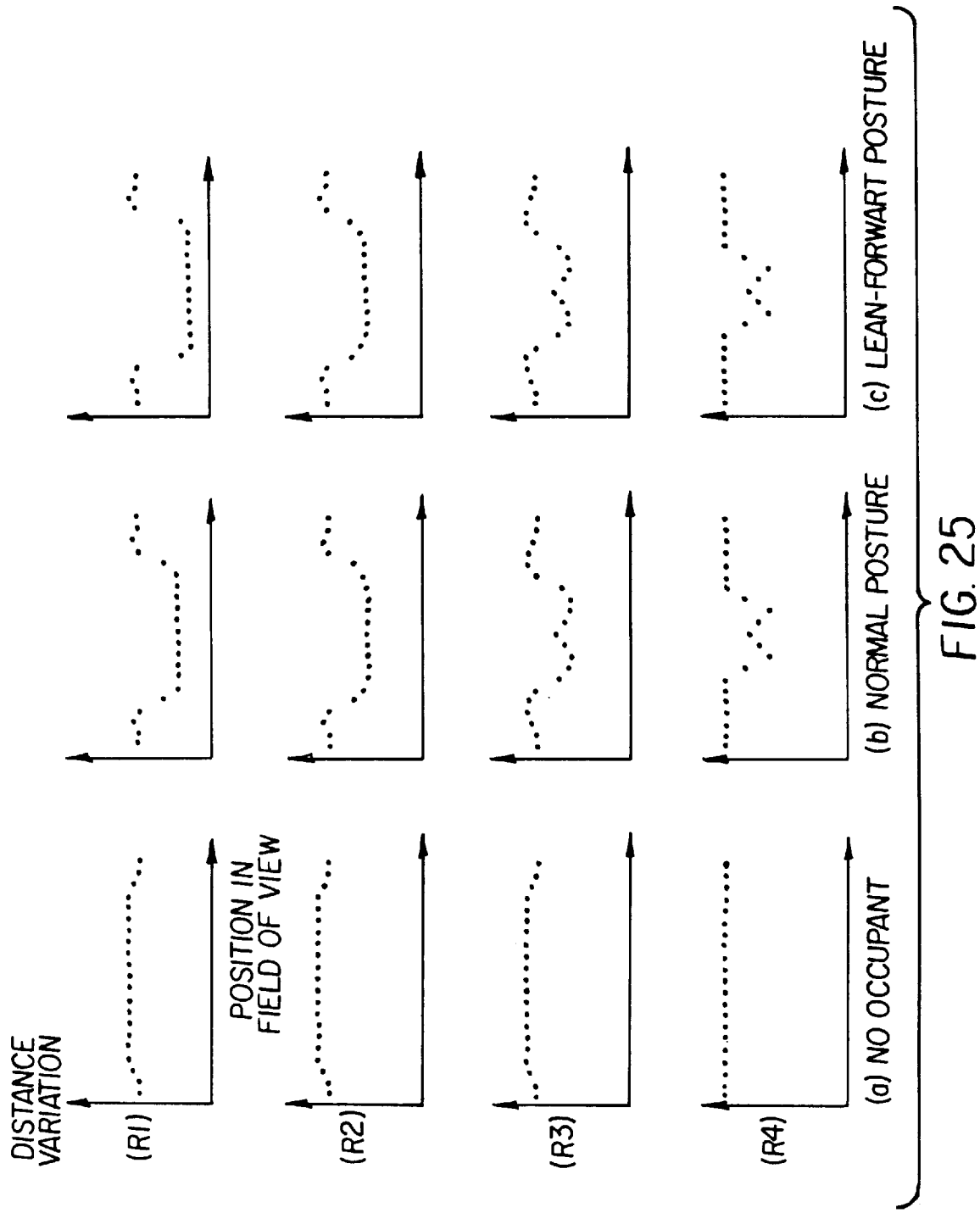
FIG. 25 is an explanatory view showing examples of distance measurements in each case of FIG. 22.
Figure 26:
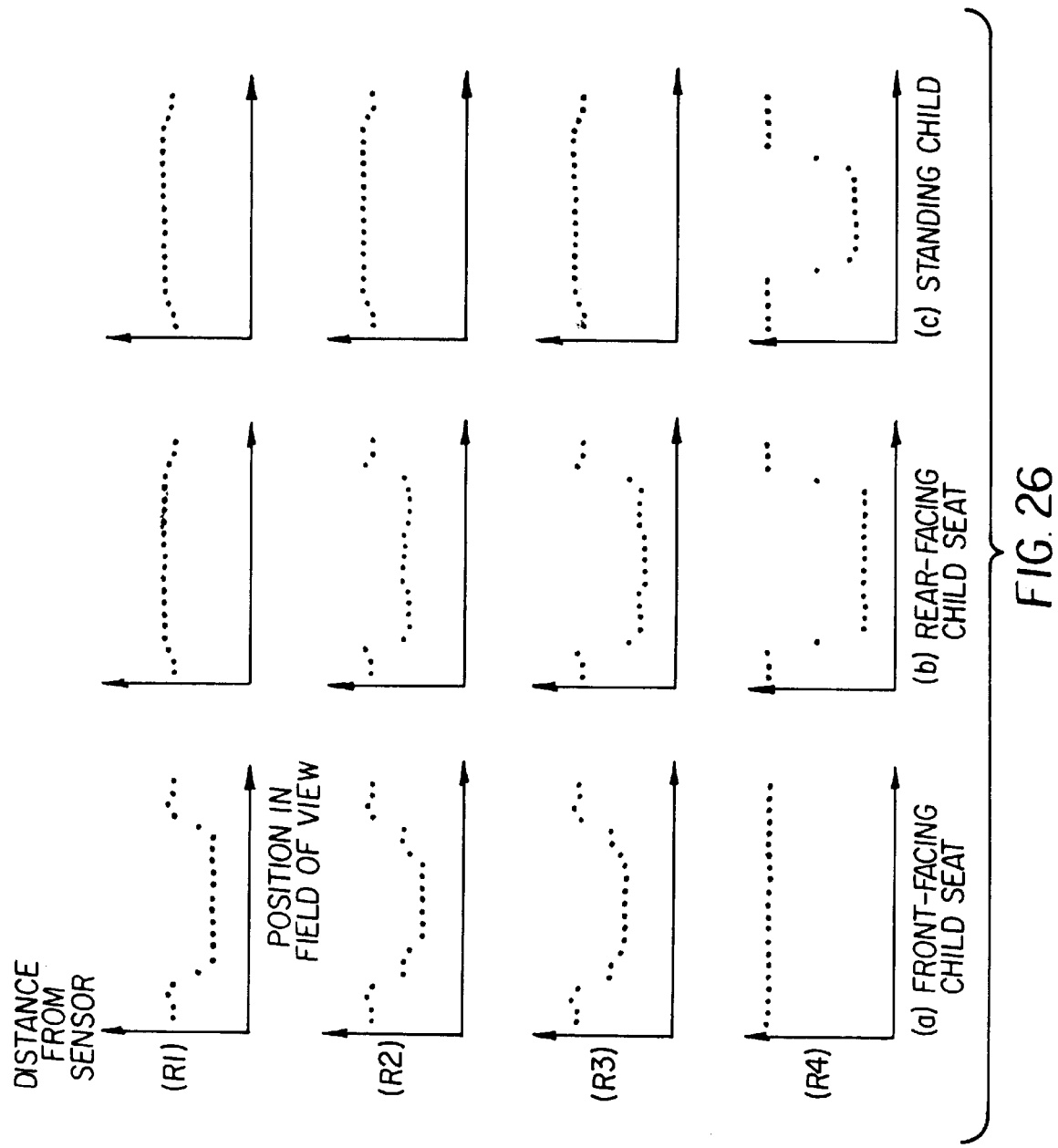
FIG. 26 is an explanatory view showing examples of distance measurements in each case of FIG. 23.
Figure 27:
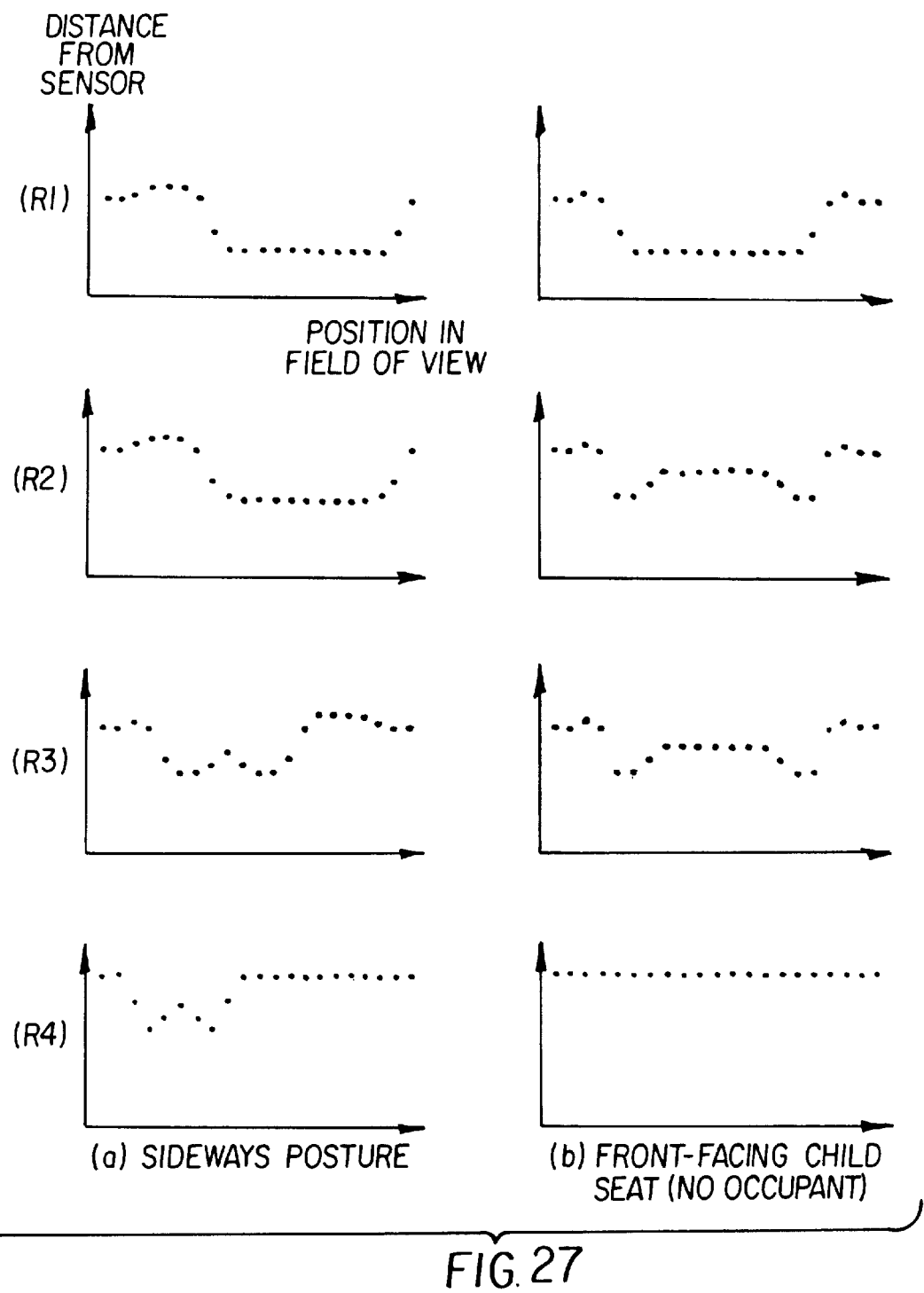
FIG. 27 is an explanatory view showing examples of distance measurements in the case of FIG. 24, and those in the case where a child seat with no occupant is mounted on a vehicle seat.

The distance distribution data are roughly classified into those in which the pattern of distance distribution is substantially symmetrical in the lateral direction with respect to the axis of inflation of an air bag (central position of the field of view in this embodiment), such as those of FIG. 25(*b*) showing the normal posture, FIG. 25(*c*) showing the forward leaning posture, FIG. 26(*c*) showing a child seat facing forward, and FIG. 27(*c*) showing a child seat facing backward, and those in which the pattern of distance distribution is asymmetrical with respect to the same axis, such as those of the case of FIG. 27(*a*) where an occupant sits sideways on the seat. In this embodiment, the occupant's posture is initially discriminated by noticing or observing the symmetry of the pattern represented by distance distribution data for each field of view.

Figure 8A:
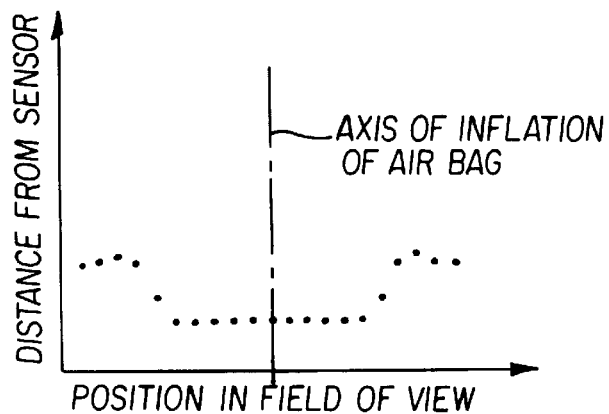
FIG. 8 is a first explanatory view for explaining the first embodiment of the present invention.
Figure 8B:
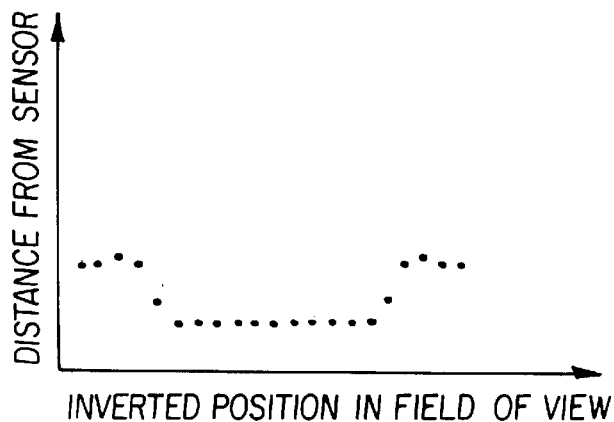
Figure 8C:
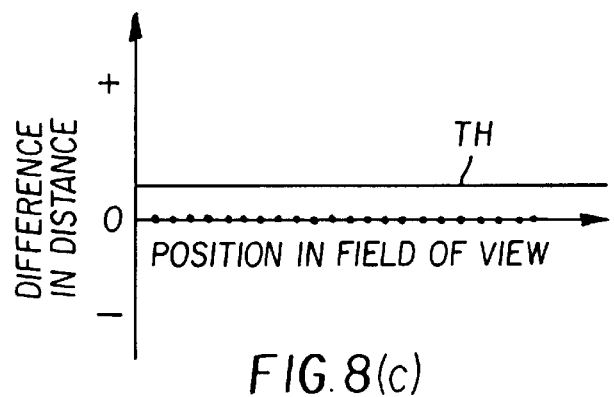
Figure 9A:
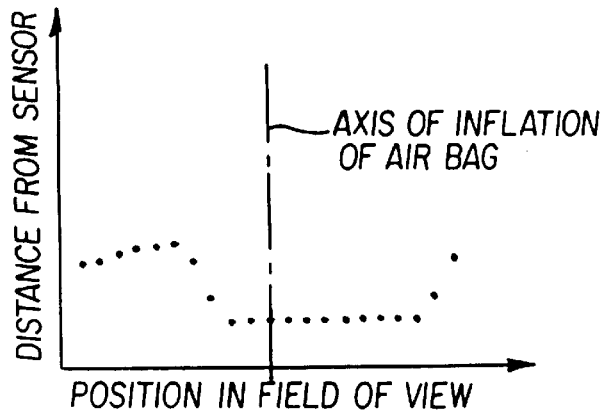
FIG. 9 is a second explanatory view for explaining the first embodiment of the invention.
Figure 9B:
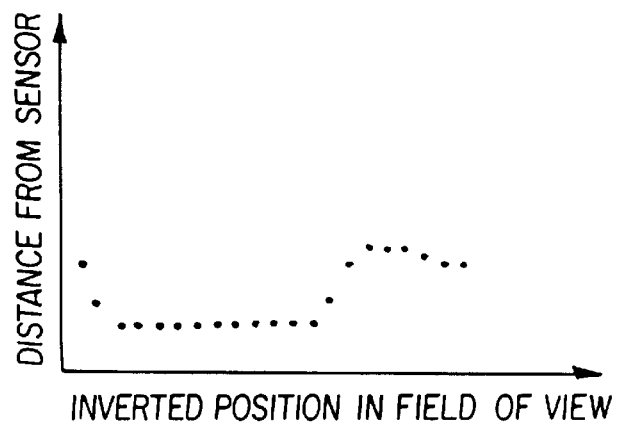
Figure 9C:
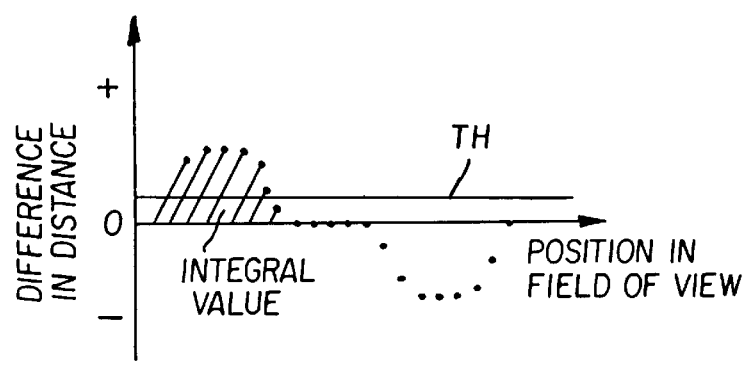

To observe the symmetry of distance distribution data, a pattern of distance distribution data for a certain field of view as shown in FIG. 8(*a*) is inverted (rotated by 180°) about the axis of inflation of the air bag within the field of view, to provide a pattern of distance distribution as shown in FIG. 8(*b*), and differences between the patterns of distance distributions of FIG. 8(*a*) and FIG. 8(*b*) are obtained as shown in FIG. 8(*c*). Similarly, a pattern of distance distribution data for a certain field of view as shown in FIG. 9(*a*) is inverted or rotated by 180° with respect to the same axis, to provide a pattern of distance distribution as shown in FIG. 9(*b*), and differences between the patterns of distance distributions of FIG. 9(*a*) and FIG. 9(*b*) are obtained as shown in FIG. 9(*c*).

The differences thus obtained are compared with a predetermined threshold value TH, or an integral value S of the differences on the positive side or negative side is compared with a predetermined threshold value THS, to thus determine the symmetry of the pattern of distance distribution. This process is performed by the discriminating portion 103.

Figure 24:
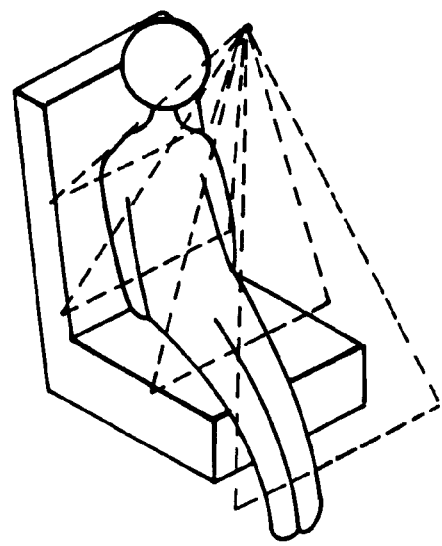
FIG. 24 is a third explanatory view showing the relationship between a vehicle seat, occupant's posture, and horizontal fields of view.
Figure 22:
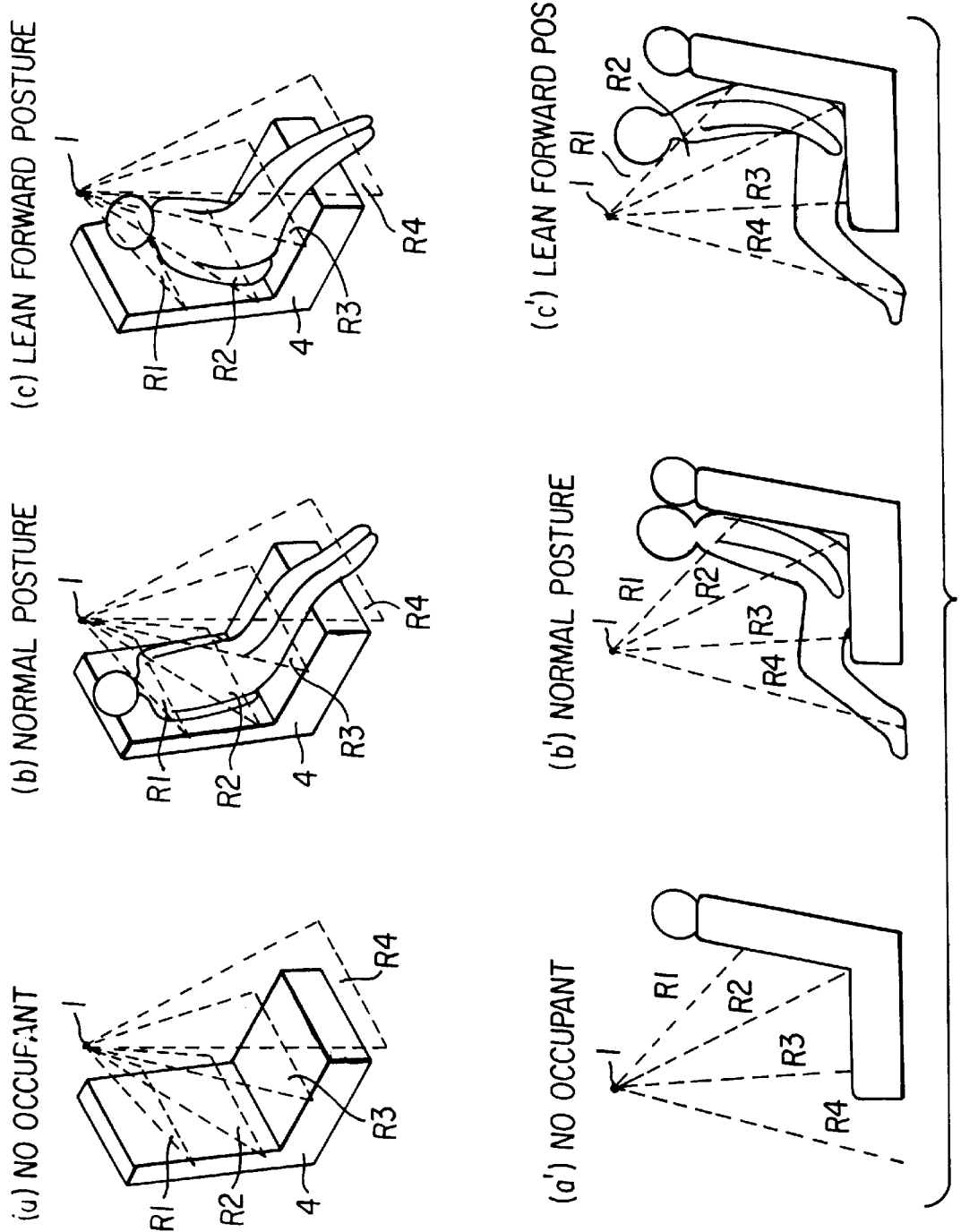
FIG. 22 is a first explanatory view showing the relationship between a vehicle seat, occupant's posture, and horizontal fields of view.
Figure 23:
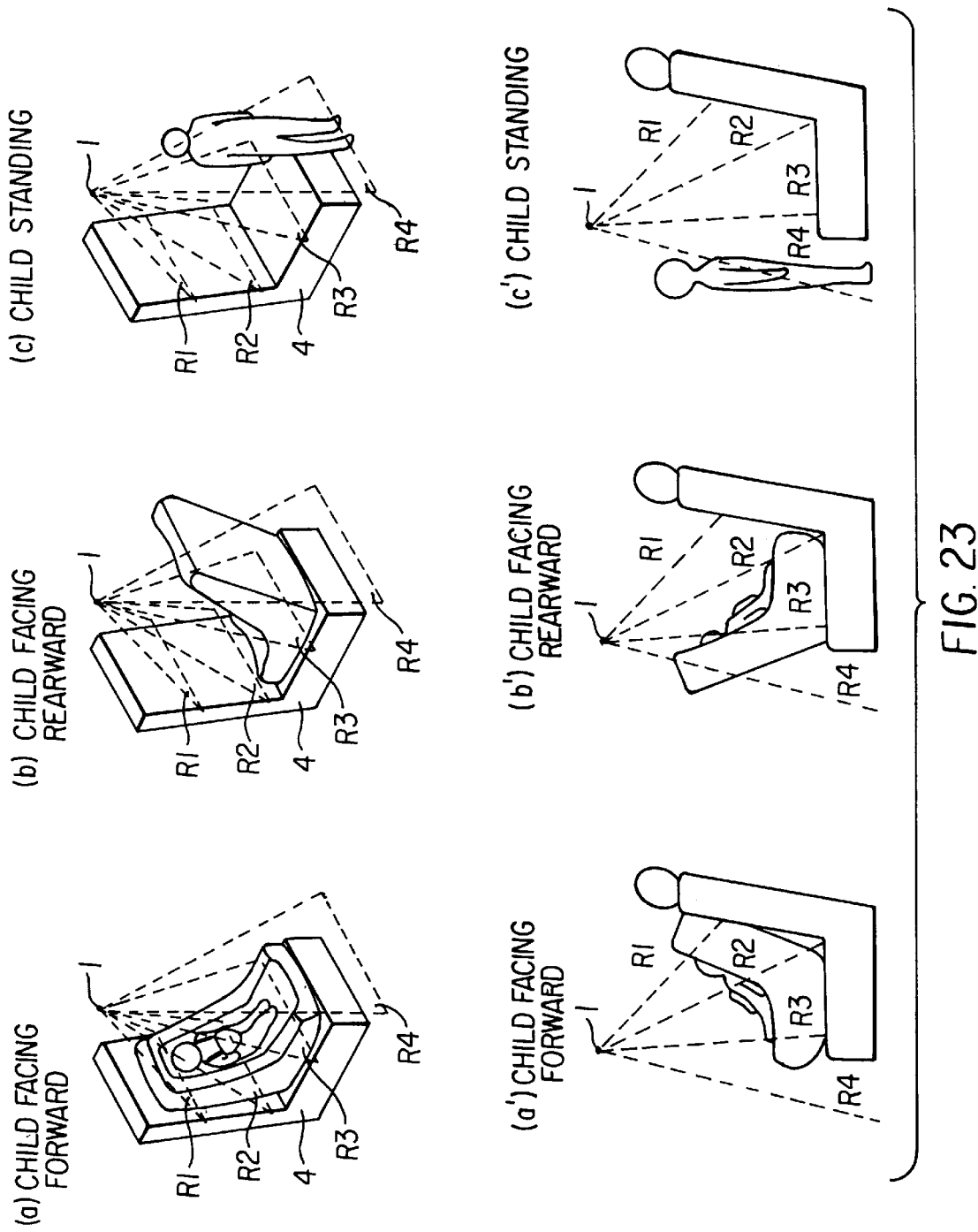
FIG. 23 is a second explanatory view showing the relationship between a vehicle seat, occupant's posture, and horizontal fields of view.

In the case of FIG. 8 where the pattern of distance distribution in the relevant field of view is symmetrical in the lateral direction, a difference at each lateral position in the field of view is smaller than the threshold value TH, and an integral of differences at all positions is also smaller than the threshold value THS. In the case of FIG. 9 where the pattern of distance distribution in the relevant field of view is asymmetrical in the lateral direction, namely, where the occupant sits sideways on the seat as shown in FIG. 24, differences at some lateral positions in the field of view are larger than the threshold value TH, and an integral of positive differences is also larger than the threshold value THS. In this manner, the determining device 1031 can determine whether the distance distribution is symmetrical or not, and select a narrower range of model patterns with which the pattern of distance distribution in question is to be compared for pattern matching, which results in a significantly reduced processing time. The comparator 1032 serves to narrow a range of model patterns for pattern matching, by comparing the output signal of the determining device 1031 with groups of model patterns of distance distributions stored in the memory 1033, and output the result as an output signal "A".

Where symmetry is observed in the pattern of the distance distribution in question, the comparator 1032 selects certain groups of symmetrical patterns of distance distributions, such as those of FIG. 22(*a*) indicating the absence of an occupant, FIG. 22(*b*) indicating an occupant sitting in the normal posture, FIG. 22(*c*) indicating an occupant leaning forward, FIG. 23(*a*) indicating a child seat facing forward and mounted on the vehicle seat, and FIG. 23(*b*) indicating a child seat facing backward and mounted on the seat. Where symmetry is not observed in the distance distribution pattern, on the other hand, the comparator 1032 selects various other patterns indicating that an occupant sits sideways on the seat as in the case of FIG. 24, for example.

As the second method for selecting a narrower range of model patterns of distance distributions for pattern matching, the similarity of variations in the distance distributions between a plurality of fields of view is observed. This process is performed by the discriminating portion 104 of FIG. 7.

Figure 10:
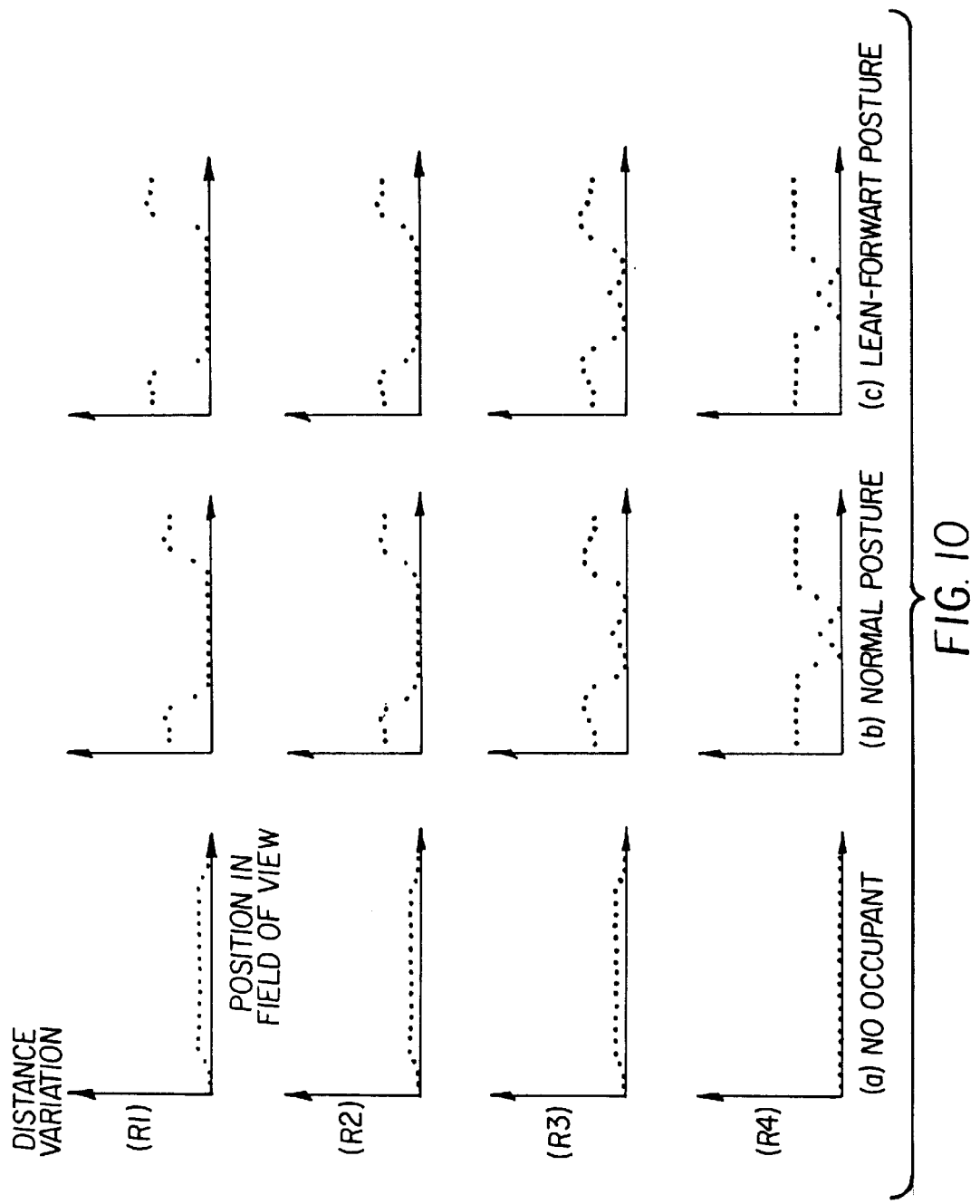
FIG. 10 is a first explanatory view for explaining the second embodiment of the present invention.
Figure 11:
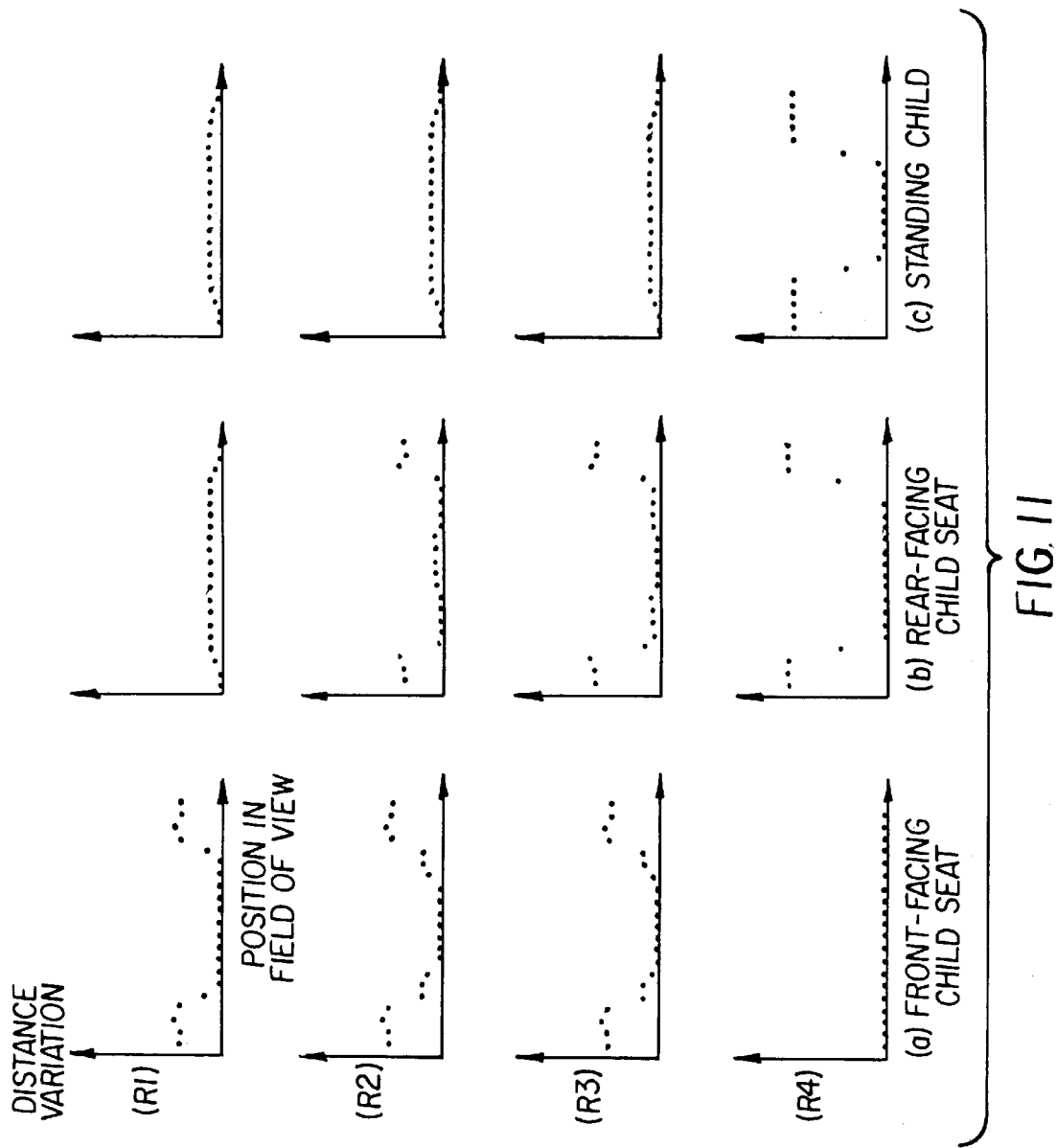
FIG. 11 is a second explanatory view for explaining the second embodiment of the invention.
Figure 12:
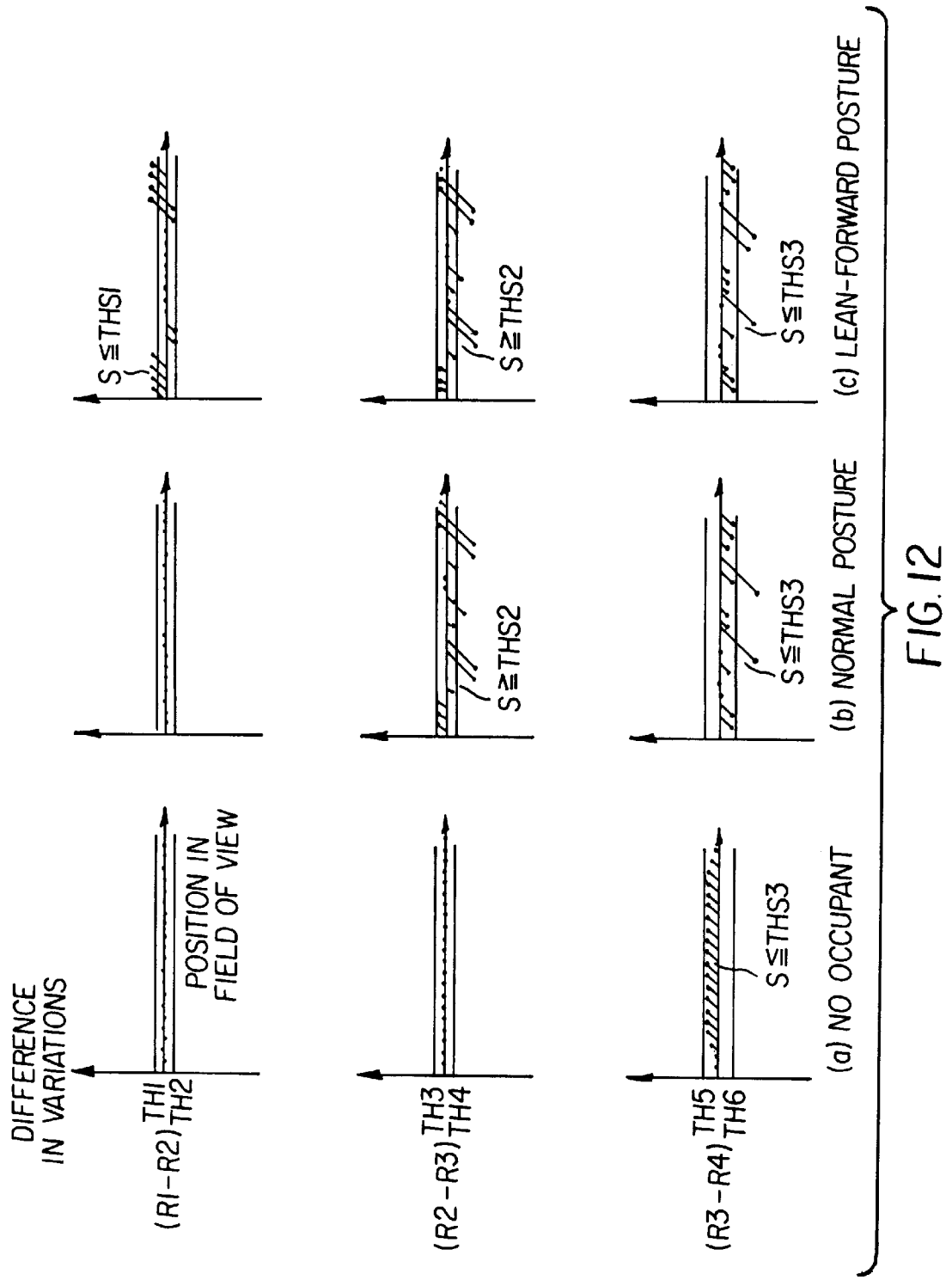
FIG. 12 is a third explanatory view for explaining the second embodiment of the invention.
Figure 13:
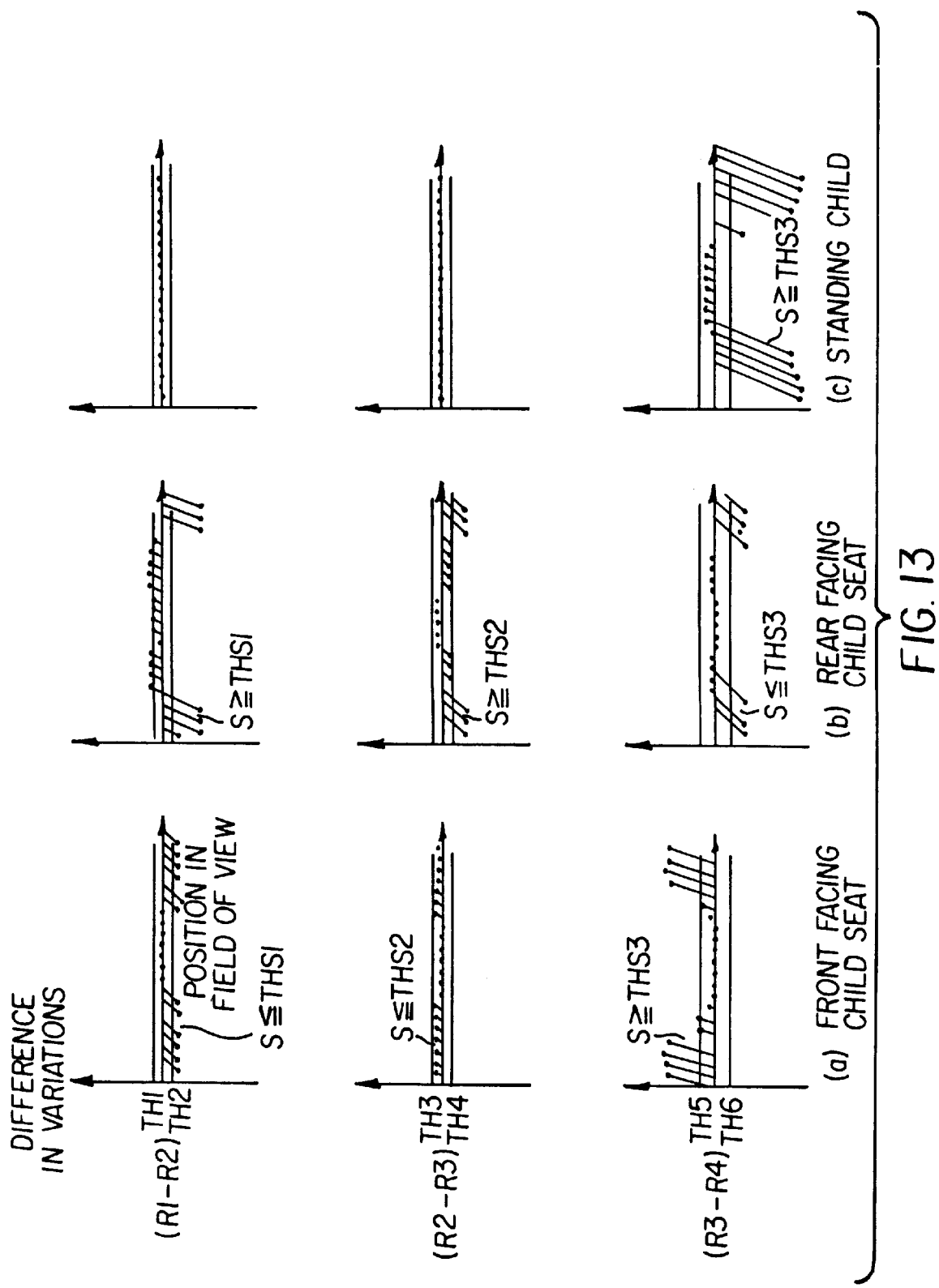
FIG. 13 is a fourth explanatory view for explaining the second embodiment of the invention.

FIGS. 10 and 11 are views for explaining this process to narrow the range of patterns for pattern matching, which views show selected portions of FIGS. 25 and 26, respectively, in which only variations in the distances from the sensor are shown. When observing the patterns in the fields of view of FIGS. 10 and 11 that particularly indicate variations in the distances, a high degree of similarity is recognized among the fields of view R1, R2 and R3 of FIG. 10(*a*) where no occupant is present on the seat, between the fields of view R1 and R2 of FIG. 10(*b*) showing the normal posture, between the fields of view R2 and R3 of FIG. 11 (*a*) showing a child seat facing forward, and among the fields of view R1, R2 and R3 of FIG. 11(*c*) showing a standing child. The similarity is detected by the calculator 1041 of the discriminating portion 104.

With regard to each case as shown in FIGS. 10 and 11, FIGS. 12 and 13 respectively show differences between the distance distribution in the field of view R1 and the distance distribution in the field of view R2, differences between the distance distribution in the field of view R2 and the distance distribution in the field of view R3, and differences between the distance distribution in the field of view R3 and the distance distribution in the field of view R4. Each of the thus obtained differences is compared with a corresponding one of predetermined threshold values TH1–TH6, or an integral value S of absolute values of the differences is compared with a corresponding one of predetermined threshold values THS1–THS3, so as to determine a degree of similarity between the patterns of distance distributions in the adjacent fields of view. The comparator 1042 utilizes this result to select a narrower range of model patterns of distance distributions stored in the memory 1043 for pattern matching, which leads to reduction in the processing time.

The third method for selecting a narrower range of model patterns for pattern matching will be explained with reference to FIG. 14 and FIG. 15.

This method is carried out by noticing that the pattern of distance distribution in each of the fields of view R1–R4 may have a convex shape or a concave shape, depending upon the presence and posture of an occupant on the vehicle seat. For example, the patterns of distance distributions in the fields of view R1, R2, R3 where no occupant sits on the seat have a convex shape, and the pattern of distance distribution in the field of view R4 in the same case has a monotonous or flat shape. The patterns of distance distributions in the fields of view R1, R2 where an occupant sits in the normal posture have a concave shape, and those in the field of view R1, R2 where an occupant on the seat leans forward have a concave shape. The patterns of distance distributions in the fields of view R1, R2, R3 where a child seat facing forward is mounted on the seat have a concave shape, and that in the field of view R4 in the same case has a monotonous or flat shape. The pattern of distance distribution in the field of view R1 where a child seat facing backward is mounted on the seat has a convex shape, and those in the fields of view R2, R3, R4 in the same case have a concave shape. The patterns of distance distributions in the fields of view R1, R2, R3 where a child is standing in front of the vehicle seat have a convex shape, and that in the field of view R4 in the same case has a concave shape. In this connection, "convex shape" means that the pattern of distance distribution projects upwards from its opposite end portions, and "concave shape" means that the pattern of distance distribution projects downwards from its opposite end portions. The determining device 1051 of the discriminating portion IOs examines the shapes of the distance distribution patterns in respective fields of view, and the comparator 1052 compares these patterns with model patterns stored in the memory 1053. It is thus possible to narrow the range of model patterns of distance distributions for pattern matching.

Figure 14:
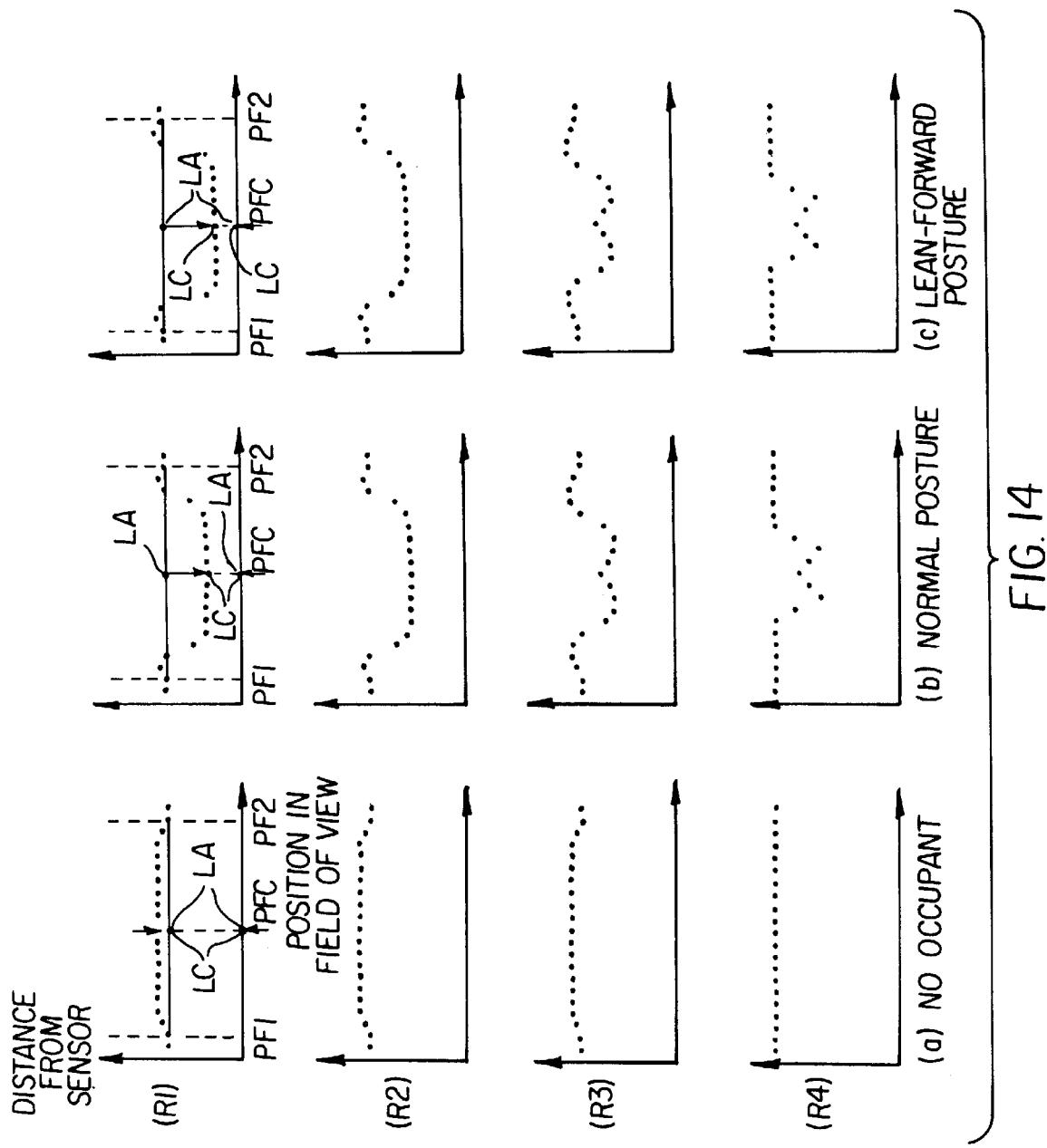
FIG. 14 is a first explanatory view for explaining the third embodiment of the present invention.
Figure 15:
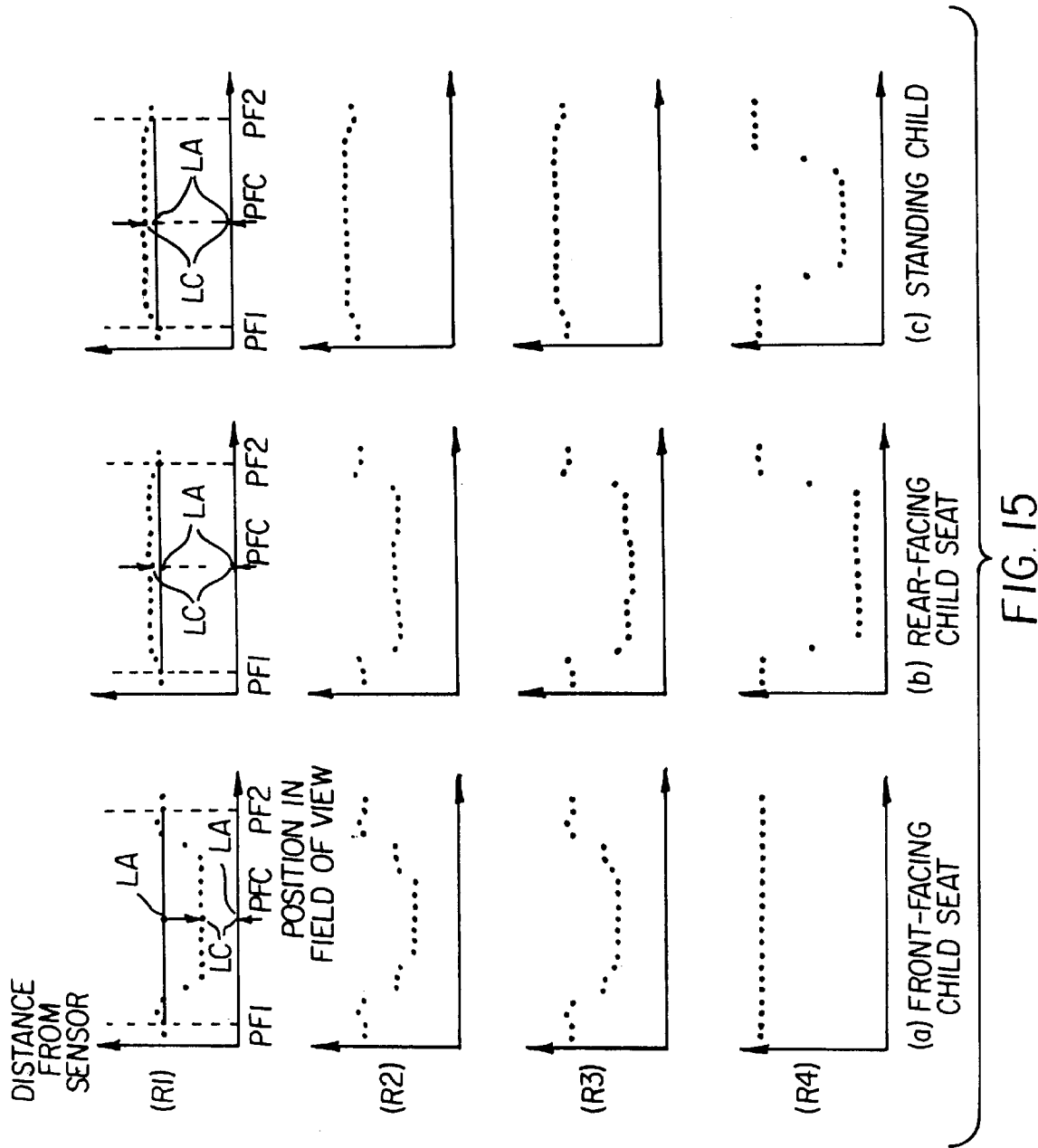
FIG. 15 is a second explanatory view for explaining the third embodiment of the invention.

FIG. 14 and FIG. 15 show specific examples in which the above-described method is carried out only with respect to the field of view R1 in each case.

Initially, an average value LA of a distance measured at a first position PF1 in the field of view R1 and a distance measured at a second position PF2 in the same field of view R1 is obtained. Then, the average value LA thus obtained is compared with a distance LC measured at an intermediate position PFC between the first position PF1 and the second position PF2, to determine the shape of the distance distribution pattern. The distance distribution pattern has a convex shape if LC is smaller than LA, and has a concave shape if LC is larger than LA. The distance distribution pattern has a flat shape if LC is equal to LA. This determination may also be made with respect to fields of view other than R1, so that the range of model patterns used for pattern matching can be further narrowed.

As the fourth method (fourth embodiment) for selecting a narrower range of model patterns for pattern matching, the posture of the occupant is generally determined based on information on distances measured at a particular position of at least one, preferably, a plurality of fields of view.

Figure 16:
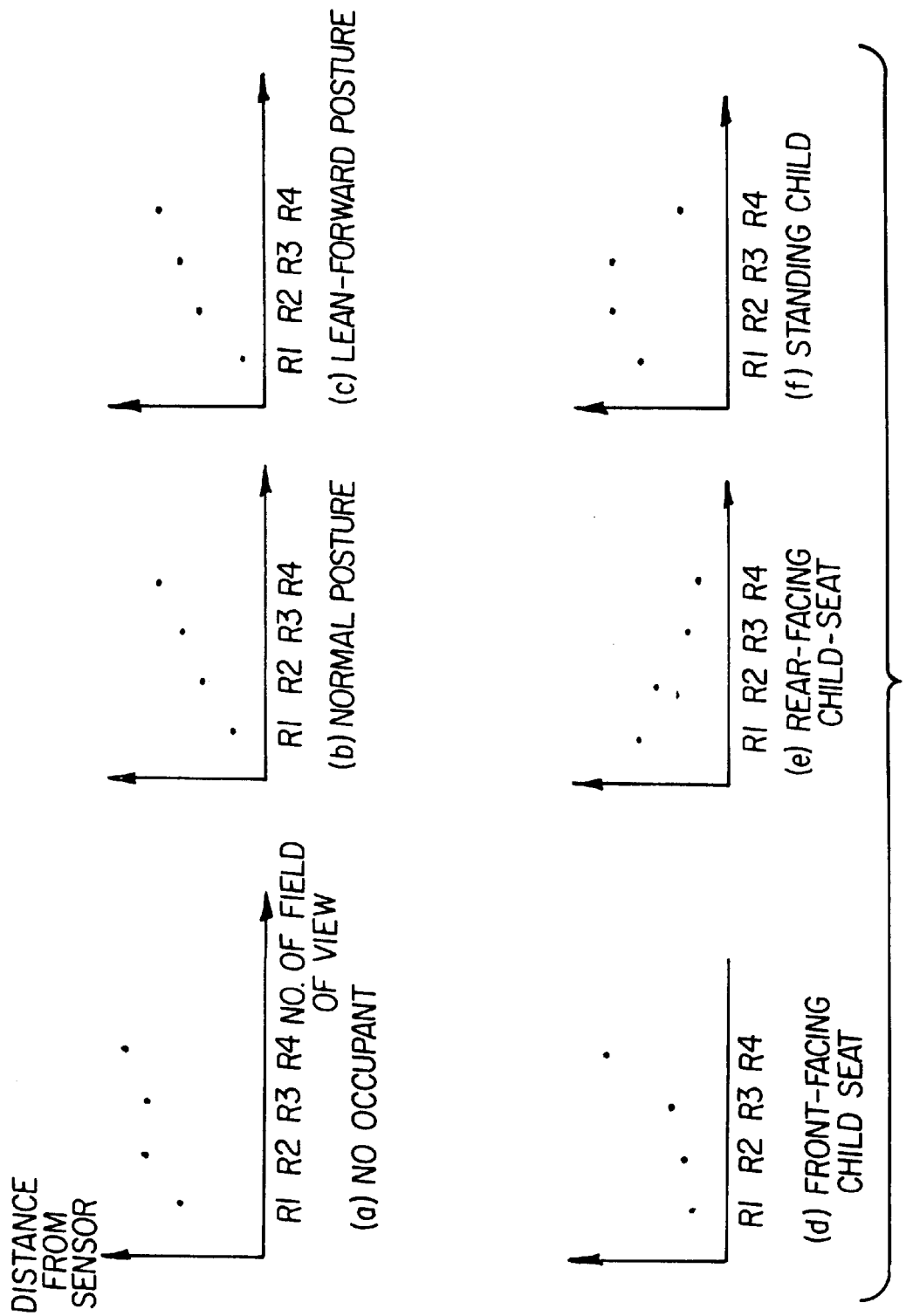
FIG. 16 is an explanatory view for explaining the fourth embodiment of the present invention.

FIG. 16 shows an example that explains this method, and each of distance distribution charts indicates a distance from the sensor to a particular position, e.g., central position, in each of the fields of view R1–R4. Patterns shown in this example may be classified into a first group in which the distance tends to increase from the field of view R1 toward R4, as in the case of FIG. 16(*a*) where no occupant is present, that of FIG. 16(*b*) where an occupant sits in the normal posture, that of FIG. 16(*c*) where an occupant sitting on the seat leans forward, and that of FIG. 16(*d*) where a child seat facing forward is mounted in the vehicle seat, a second group in which the distance tends to decrease from the field of view R1 toward R4, as in the case of FIG. 16(*e*) where a child seat facing backward is mounted in the vehicle seat, and a third group in which the maximum value is present in an intermediate part of the pattern as in the case of FIG. 16(*f*) where a child is standing in front of the vehicle seat.

Figure 35:
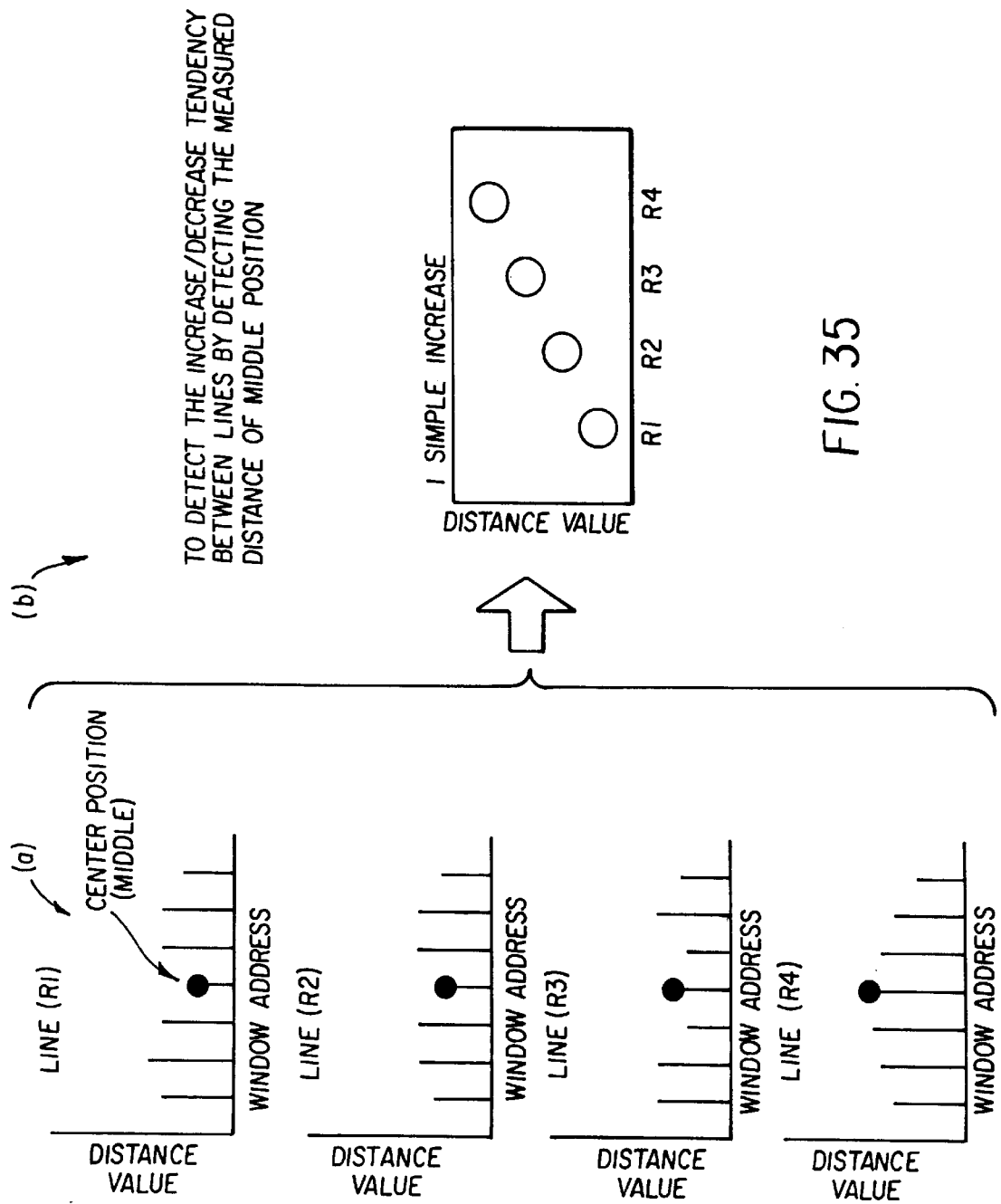
FIG. 35($a$) illustrates distance information within respective fields of view and FIG. 35($b$) illustrates derivation of distance values within respective fields of view.
Figure 36:
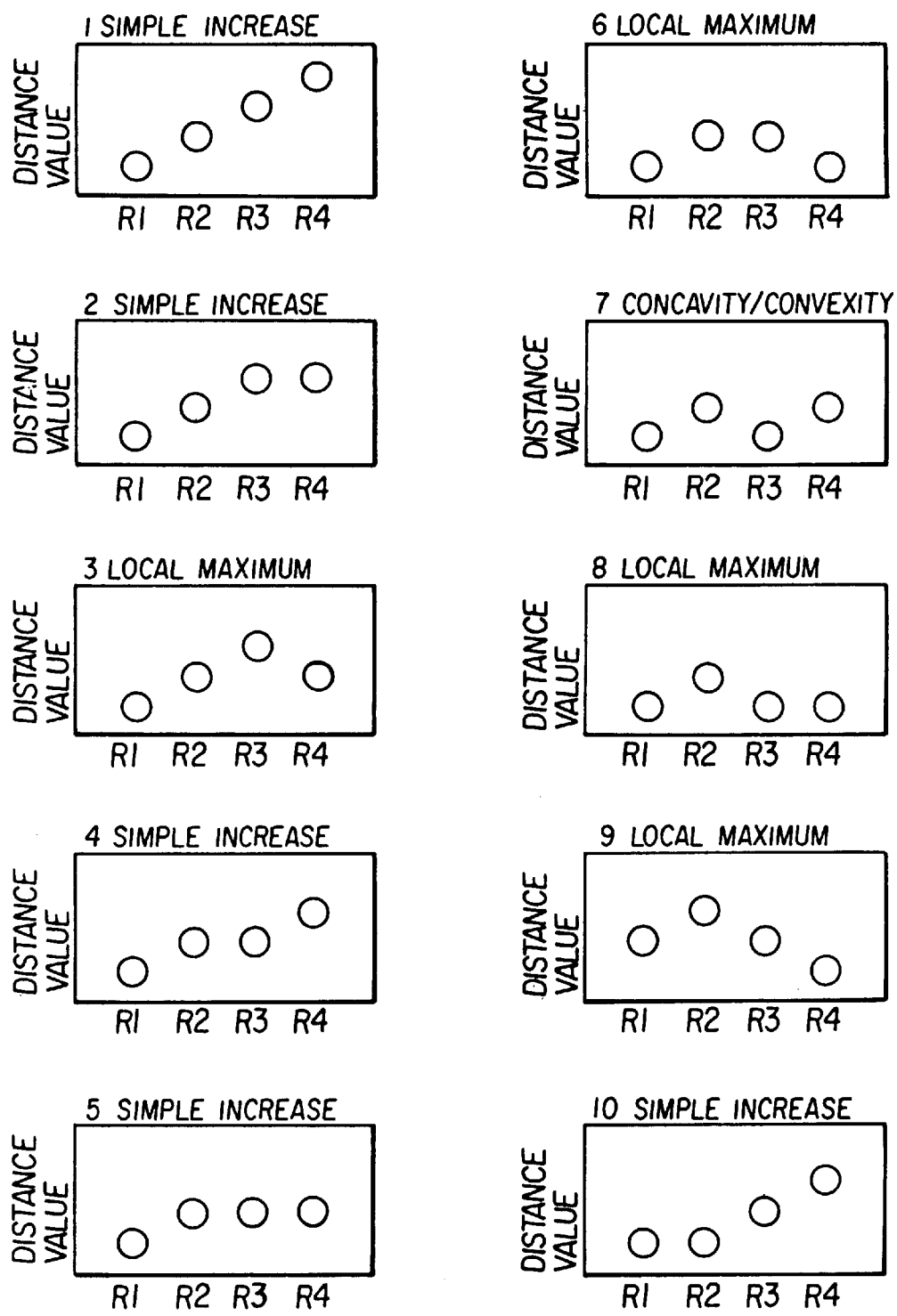
FIGS. 36–38 illustrate increase/decrease patterns that are stored in memory.
Figure 37:
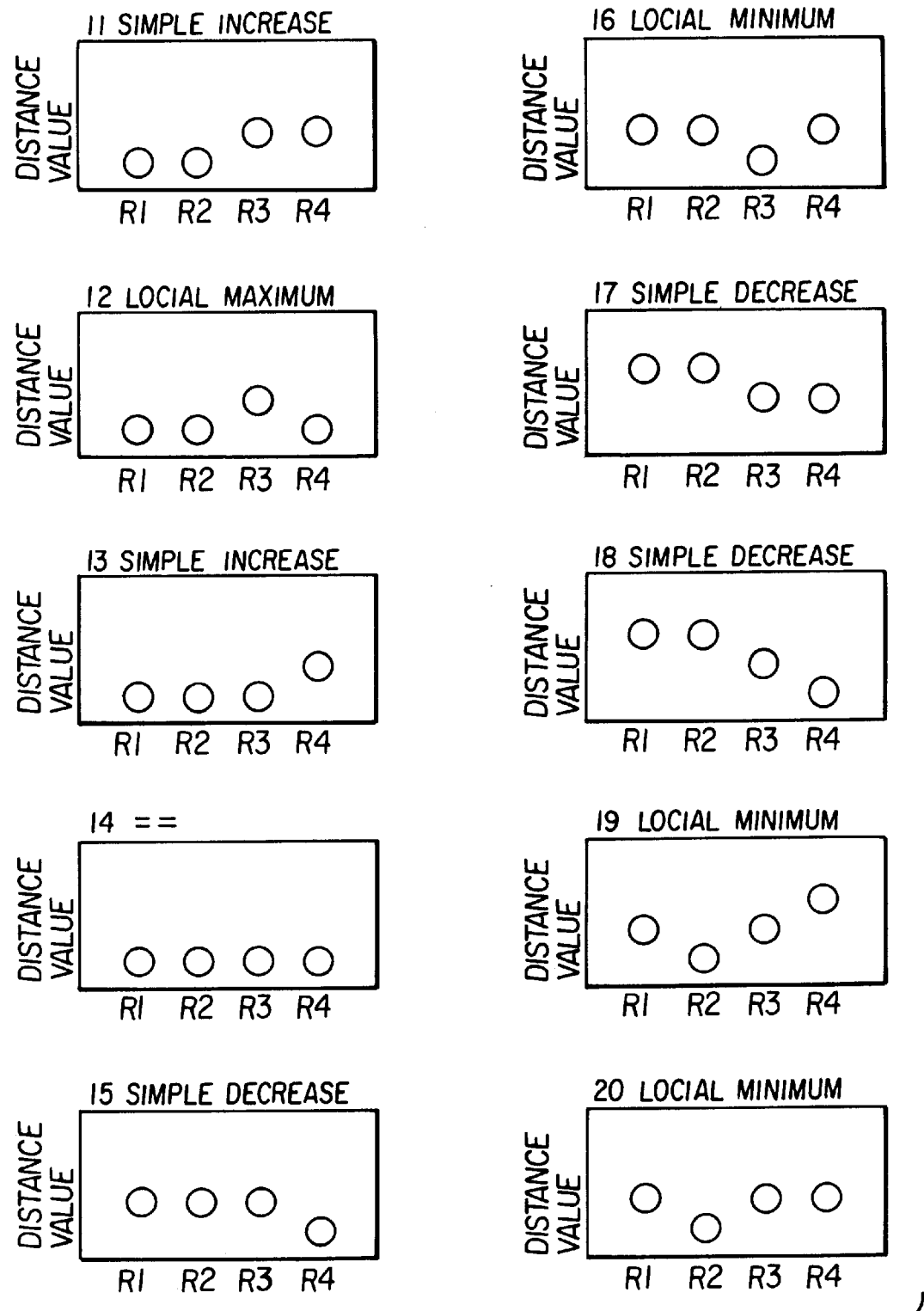
Figure 38:
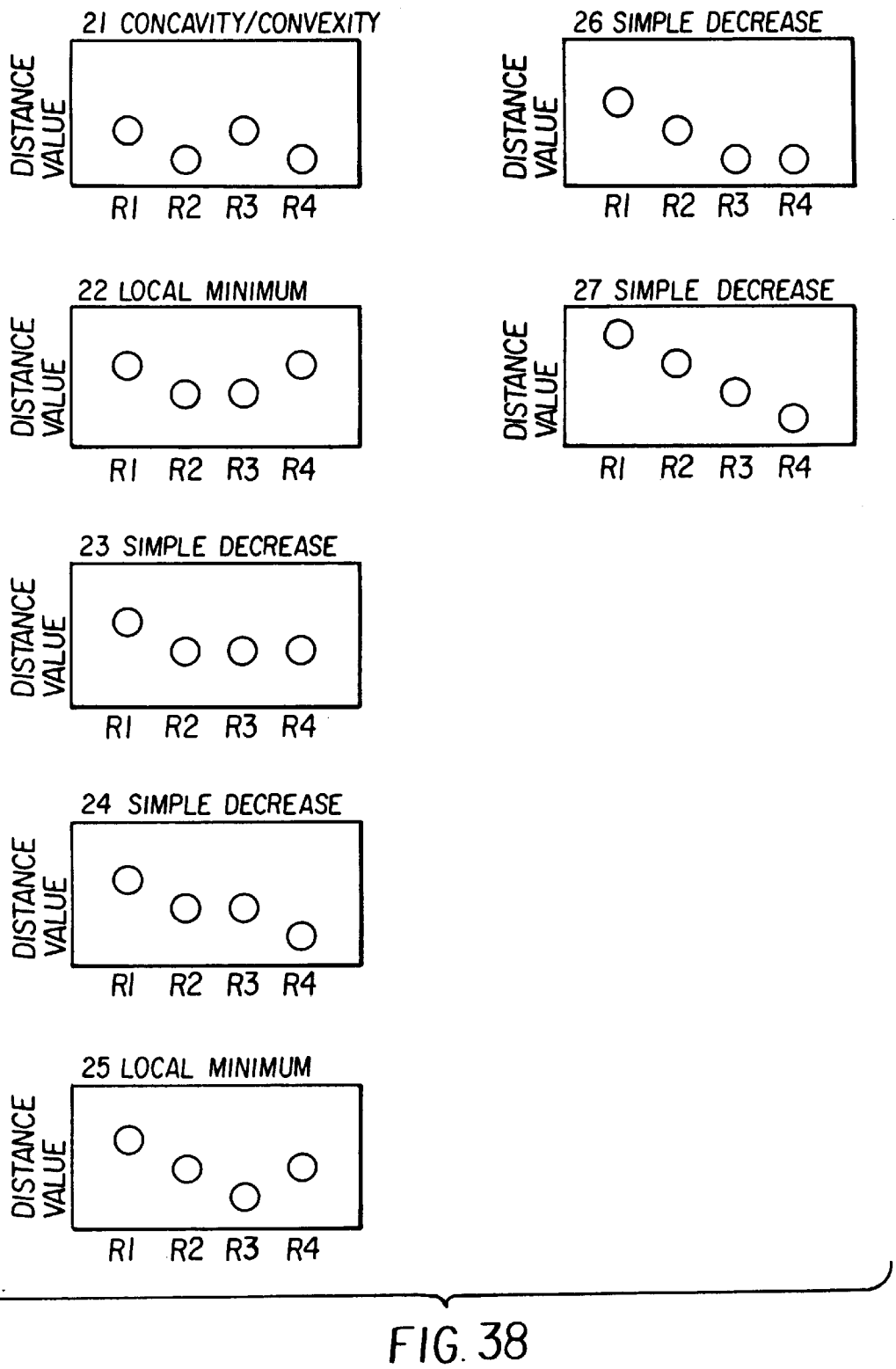

More specifically described, distance information within respective fields of view as shown in FIG. 35(*a*) is obtained by the occupant sensor 1 whose linear fields of view R1, R2, R3 and R4 are set or defined in substantially horizontal directions with respect to an occupant. The distance information is received by the extractor 1061 of the discriminating portion 106, which in turn derives distance values at the middle positions of respective fields of view from this information, thereby to obtain increases or decreases in distance between the fields of view, as shown in FIG. 35(*b*). If the results of the distance increase/decrease in the respective fields of view R1, R2, R3, R4 are patterned in the order of R1, R2, R3, R4, with "+" representing increase and "−" representing decrease, the results in the case of FIG. 35(*b*) are pattern into "+, +, +, +". On the other hand, the reference memory 1063 preliminarily stores twenty-seven model increase/decrease patterns as shown in FIGS. 36–38, which are associated with various postures of occupants and shapes of objects. If the middle distance value/ reference value comparator 1063 compares the output pattern "+, +, +, +" of the extractor 1061 with the twenty-seven model increase/decrease patterns stored in the reference value memory 1063, this output pattern "+, +, +, +" is judged as "monotonous increase" indicated by the model increase/decrease pattern 1, and this result is generated as output D to the comparator 108.

It is to be noted that the patterning performed by the extractor 1061 is based on only increases and decreases in the distance between the fields of view, and absolute values of distances measured at the middle positions of respective fields of view are not used for comparison or pattern matching. This is why the increase/decrease pattern obtained in the case of "adust (lean-forward posture)/seat position: 0" has the same result of "9" as those of "child seat (backward)/seat position: 0" of FIG. 31 and "standing child/seat position: 0" of FIG. 34, even though an absolute values of distance in each field of view is different among these cases. Thus, these three cases cannot be discriminated from each other only by "determination on increases/decreases in distance between lines" by the discriminating portion 106.

As described above, the range of model patterns for pattern matching can be narrowed by making "determination on the lateral symmetry of distance distribution" in the discriminating portion 103, "determination on similarity between lines" in the discriminating portion 104, "concavity/convexity determination" in the discriminating portion 105, and "determination on increases/decreases in distance between lines" in the discriminating portion 106, and therefore the posture of the occupant can be determined based on a relatively small amount of information. The "concavity/convexity determination" made by the discriminating portion 105 is not limited to that of the illustrated embodiment, but may be accomplished in another manner. For example, differences between the distance value at the middle position of a linear field of view, and all other measurement points on the linear field of view are respectively obtained, and the average of these differences is compared with a threshold value. The pattern in question has a convex shape (or protrudes upward) if this average value is larger than the threshold value, and has a concave shape (or protrudes downward) if the average value is smaller than the threshold value. If the average value is in a certain range of the threshold value, it may be determined that the pattern has a flat shape.

If the manner of inflating an air bag can be determined based on the result of determination on the fourth embodiment as described above, the air bag may be inflated in the manner thus determined when a collision occurs. If the manner of inflating an air bag needs to be determined based on more detailed posture information, using information on distances measured at numerous positions as well as the particular position in each field of view, however, the posture determining process or routine may not be timely performed since the central processing unit 201 (ECU) is also used for other vehicle controls. This problem may be avoided by executing the posture determining routine before other non-emergent routines upon occurrence of a collision, so that the posture of the occupant can be determined in a short time.

Figure 17:
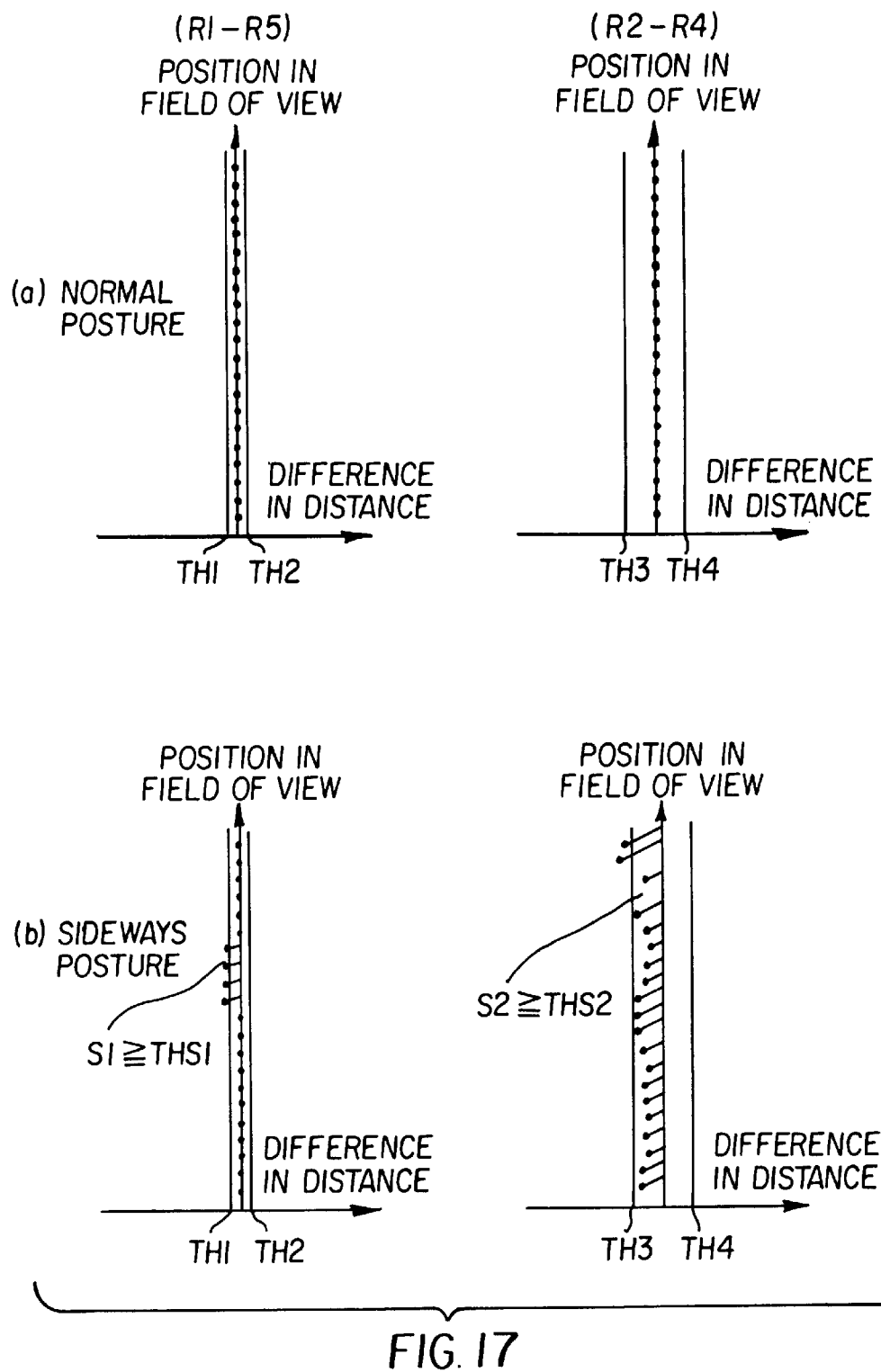
FIG. 17 is an explanatory view for explaining the fifth embodiment of the present invention.

FIG. 17 shows another embodiment of the present invention. FIGS. 18 and 19 are views showing the positional relationship among the vehicle seat, occupant, or the like, and fields of view in this embodiment, and FIG. 20 shows patterns of distance distributions in each case of FIGS. 18 and 19.

FIG. 18(*a*) is a perspective view showing a vehicle seat on which no occupant sits, FIG. 18(*a*)' is a side view corresponding to FIG. 18(*a*), FIG. 18(*b*) is a perspective view of a vehicle seat with an occupant sitting in a normal posture, FIG. 18(*b*)' is a side view corresponding to FIG. 18(*b*), FIG. 19(*a*) is a perspective view of a vehicle seat with an occupant who leans forward, and FIG. 19(*a*)' is a side view corresponding to FIG. 19(*a*). FIG. 19(*b*) is a perspective view showing a vehicle seat with an occupant who sits sideways on the seat, and FIG. 19(*b*)' is a side view corresponding to FIG. 19(*b*). This embodiment is characterized in that the fields of view used for distance measurement are set to extend in substantially vertical directions, rather than in substantially horizontal directions as in the first to fourth embodiments.

Figure 20:
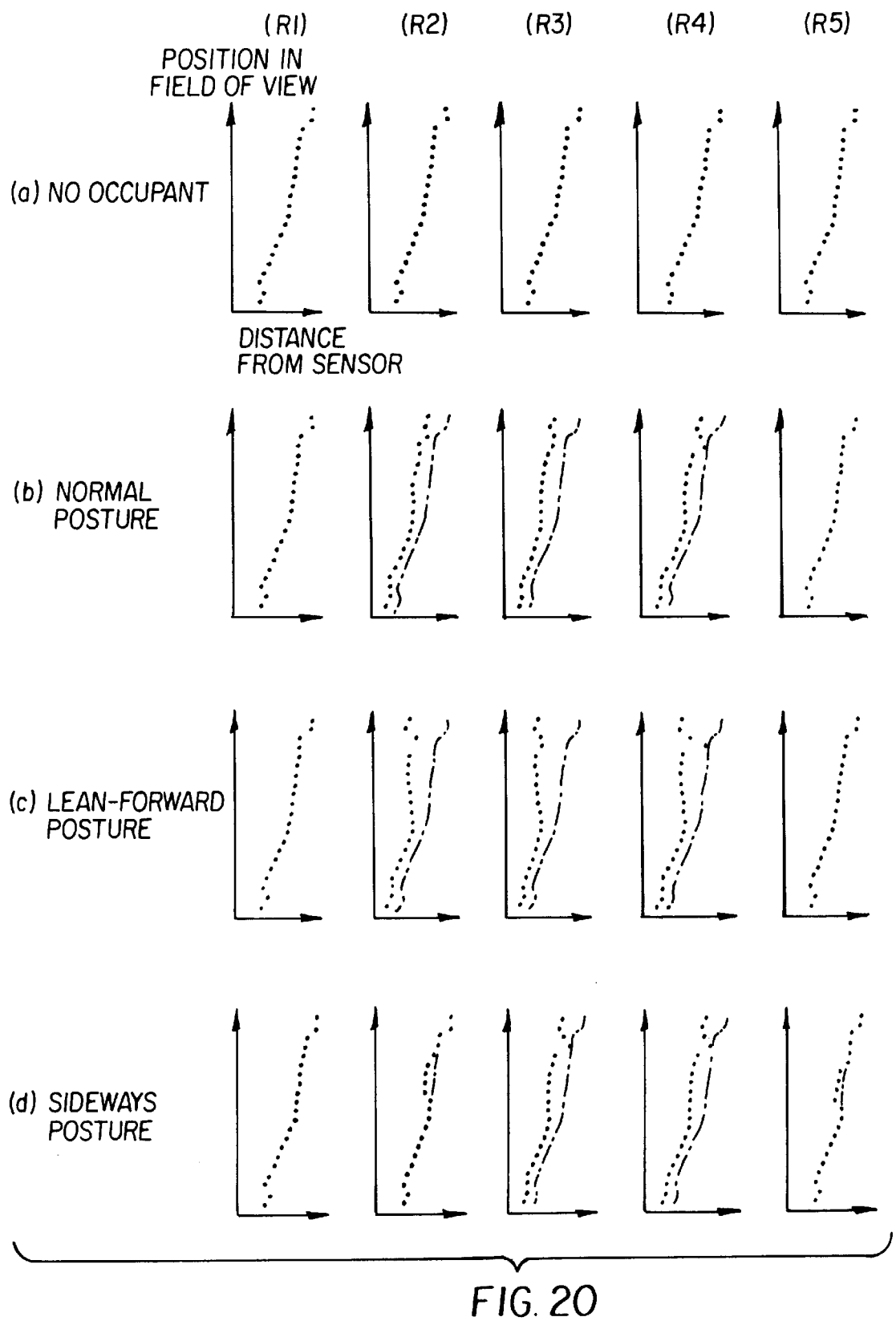
FIG. 20 is an explanatory view showing examples of distance measurements in each case of FIG. 18 and FIG. 19.
Figure 21:
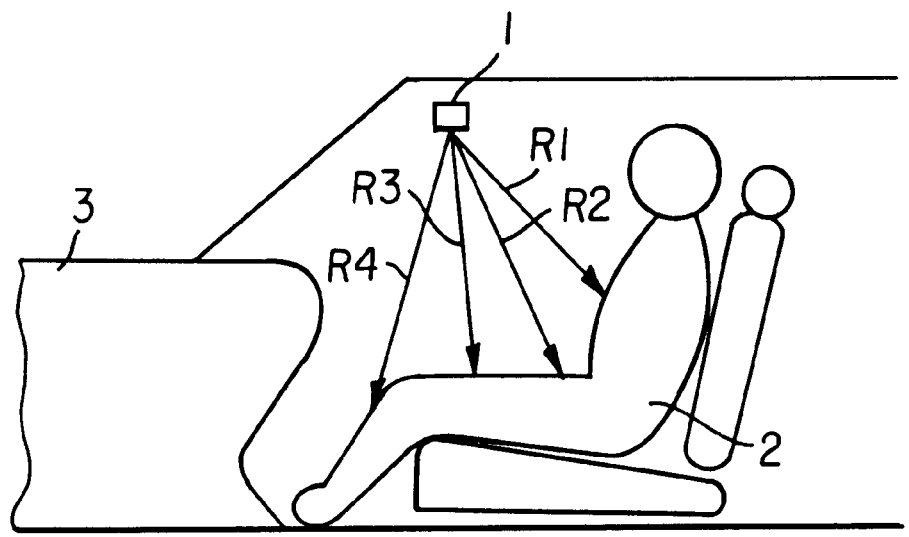
FIG. 21 is a schematic view showing a known example.

FIGS. 20(*a*)–FIG. 20(*d*) show distance distribution data obtained in each of the fields of view R1 to R5, wherein FIG. 20(*a*) shows the case where no occupant sits on the vehicle seat, FIG. 20(*b*) shows the case where an occupant sits in a normal posture, FIG. 20(*c*) shows the case where an occupant sitting on the seat leans forward, and FIG. 20(*d*) shows the case where an occupant sits sideways on the seat. In the distance distribution charts of FIG. 20, the vertical axis indicates position in the vertical field of view, and the horizontal axis indicates distance from the sensor. In FIG. 20(*b*), 20(*c*) and 20(*d*), dashed lines represent reference patterns of distance distributions obtained when no occupant is seated.

It will be understood from FIG. 20 that in some cases, such as that of FIG. 20(*a*) where no occupant sits in the seat, or that of FIG. 20(*b*) where an occupant sits in the normal posture, high similarity is observed between the patterns in the fields of view R1 and R5, and between the patterns in the fields of view R2 and R4, and in other cases, such as that of FIG. 20(*d*) where an occupant sits sideways on the seat, low similarity is observed between the patterns in the fields of view R1 and R5, and between the patterns in the fields of view R2 and R4. High similarity is also recognized between the patterns in the fields of view R1 and R5 and between the patterns in the fields of view R2 and R4 in the case where a child seat is mounted on the vehicle seat.

In the present embodiment, the degree of similarity between the patterns in the fields of view that are equally spaced from the center of the seat in the lateral direction is utilized to narrow the range of model patterns with which each distance distribution pattern is to be compared, so that the time required for determining the posture can be reduced.

FIG. 17 shows specific examples in which the degree of similarity is determined, wherein FIG. 17(*a*) shows a distribution of differences (R1–R5) obtained by subtracting distances in the field of view R5 from distances in the field of view R1, and a distribution of differences (R2–R4) obtained by subtracting distances in the field of view R4 from distances in the field of view R2 in the case where an occupant sits in a normal posture, and FIG. 17(*b*) shows distributions of differences (R1–R5), (R2–R4) obtained in the similar manner in the case where an occupant sits sideways on the vehicle seat.

In FIG. 17(*a*), the degree of similarity between the patterns in the corresponding fields of view is determined by comparing the above differences with certain threshold values TH1–TH4. In the case of FIG. 17(*a*), all of the differences are held within the threshold values, which means that the patterns in the corresponding fields of view are considerably similar to each other. Similarly, the degree of similarity may be determined based on an integral value of the differences. In FIG. 17(*b*), the degree of similarity between the patterns in the corresponding fields of view is determined by comparing integral values S1, S2 (hatched portions in FIG. 17(*b*)) of the differences (R1–R5), (R2–R4) with certain threshold values THS1, THS2. In the case of FIG. 17(*b*), both of the integral values S1, S2 exceed the threshold values THS1, THS2, which means that patterns in the corresponding fields of view have a low degree of similarity.

Namely, the patterns having high similarity include those of distance distributions in the fields of view R1 and R5 and those in the fields of view R2 and R4 in the case of FIG. 20(*a*) where no occupant sits in the seat, and those in the fields of view R1 and R5 and those in the fields of view R2 and R4 in the case of FIG. 20(*b*) where an occupant sits in a normal posture, for example. The patterns having low similarity include those of distance distributions in the fields of view R1 and R5 and those in the fields of view R2 and R4 in the case of FIG. 20(*d*) where an occupant sits sideways on the seat. Accordingly, if the patterns of distance distributions in the fields of view R1 and R5, and those in the fields of view R2 and R4 are highly similar to each other, a group of patterns having a high degree of similarity, such as those showing no occupant in the seat or an occupant having the normal posture, may be selected as model patterns to be compared with these patterns for determining the posture. If the above-described patterns of distance distributions are less similar to each other, a group of patterns having a low degree of similarity, such as those showing an occupant sitting sideways, may be selected as model patterns to be compared with these patterns for determining the posture. Thus, the time required for pattern matching can be reduced.

An air bag needs to be inflated immediately after occurrence of a collision and before a great movement of an occupant takes place, and therefore the occupant's posture needs to be determined in a short period of time from the occurrence of the collision to the time when a signal to inflate the air bag is generated. Since it takes an excessively long time to determine coincidence of patterns of distance distributions in a large number of fields of view with those of model postures, the central portion of the seat in a single field of view, e.g., R3, is normally monitored in a direction of the center axis of inflation of an air bag, and only the pattern of distance distribution in this field of view R3 is compared with model patterns of distance distributions, so that the occupant's posture is generally determined.

The result of the above determination on the general posture may be utilized upon occurrence of a collision if inflation of the air bag can be appropriately controlled based on the general posture thus determined. Where further detailed posture information is needed, however, a posture determining routine using a plurality of fields of view is executed with high priority before other nonemergent routines, to enable high-speed processing with improved safety.

According to the first to fifth aspects of the invention, distance distribution data in the fields of view are processed in various manners so that their characteristics are extracted or the amount of the data is minimized. It is thus possible to select a narrower range of model patterns of distance distributions to be compared with patterns of distance distributions actually measured for pattern matching, thereby to significantly reduce the processing time required for determining the posture of the occupant.

According to the sixth and seven aspects of the invention, the range of model patterns of distance distributions to be compared with distance distribution patterns actually measured is narrowed by observing common characteristics or similarity in the distance distribution data between a plurality of fields of view, resulting in significantly reduced processing time for pattern matching. Also, the posture of the occupant is normally determined based on at least sufficient data in case of a collision, and the result of the determination may be used if it is sufficient to control inflation of an air bag. If not, the central processing unit executes a routine for determining the occupant's posture based on more detailed data, prior to other non-emergent routines, assuring quick processing and improved safety.

What is claimed is:

1. An apparatus for determining an occupant's posture, comprising:
    a sensor having at least one pair of linear photosensor arrays each comprising a plurality of photosensor elements, said sensor forming an image of an occupant;
    a distance measurement processor that derives a distance distribution in each of at least one linear field of view that is monitored by said at least one pair of linear photosensor arrays, from the image of the occupant formed by said sensor; and
    an occupant discrimination processor that compares a pattern of the distance distribution with a plurality of model patterns of distance distributions that are preliminarily stored in the occupant discrimination processor, so as to determine the presence and posture of the occupant;
    wherein said at least one linear field of view is set to extend in a substantially horizontal direction with respect to the occupant, said occupant discrimination processor checking if the pattern of the distance distribution in each of said at least one linear field of view has symmetry in a lateral direction, and then determining the posture of the occupant by comparing the pattern of the distance distribution with a group of the model patterns of distance distributions that is preliminarily selected depending upon whether the pattern of the distance distribution has symmetry or not.

2. The apparatus according to claim 1, wherein the symmetry of the pattern of the distance distribution is determined by laterally inverting the pattern of the distance distribution in each of said at least one linear field of view with respect to a central portion thereof, obtaining differences in distances at corresponding positions of the pattern of the distance distribution before inverted and the pattern of the distance distribution after inverted within said each of said at least one linear field of view, and determining whether each of said differences is not greater than a predetermined value, or whether an integral value of said differences is not greater than a predetermined value.

3. An apparatus for determining an occupant's posture, comprising:
    a sensor having at least one pair of linear photosensor arrays each comprising a plurality of photosensor elements, said sensor forming an image of an occupant;
    a distance measurement processor that derives a distance distribution in each of at least one linear field of view that is monitored by said at least one pair of linear photosensor arrays, from the image of the occupant formed by said sensor; and
    an occupant discrimination processor that compares a pattern of the distance distribution with a plurality of model patterns of distance distributions that are preliminarily stored in the occupant discrimination processor, so as to determine the presence and posture of the occupant;
    wherein said at least one linear field of view is set to extend in a substantially horizontal direction with respect to the occupant, said occupant discrimination processor determining a degree of similarity in terms of variations in the pattern of the distance distribution between adjacent ones of said at least one linear field of view, and then determining the posture of the occupant by comparing the pattern of the distance distribution with a group of the model patterns of distance distributions that is preliminarily selected depending upon the degree of similarity.

4. The apparatus according to claim 3, wherein said degree of similarity between adjacent ones of said at least one linear fields of view is determined by obtaining differences in variations in the pattern of the distance distribution at corresponding positions of said adjacent ones of said at least one linear field of view, and determining whether each of said differences is not greater than a predetermined value, or an integral value of said differences is not greater than a predetermined value.

5. An apparatus for determining an occupant's posture, comprising:
- a sensor having at least one pair of linear photosensor arrays each comprising a plurality of photosensor elements, said sensor forming an image of an occupant;
- a distance measurement processor that derives a distance distribution in each of at least one linear field of view that is monitored by said at least one pair of linear photosensor arrays, from the image of the occupant formed by said sensor; and
- an occupant discrimination processor that compares a pattern of the distance distribution with a plurality of model patterns of distance distributions that are preliminarily stored in the occupant discrimination processor, so as to determine the presence and posture of the occupant;
- wherein said at least one linear field of view is set to extend in a substantially horizontal direction with respect to the occupant, said occupant discrimination processor determining a concave shape or a convex shape of the pattern of the distance distribution between a first position and a second position in each of said at least one linear field of view, and then determining the posture of the occupant by comparing the pattern of the distance distribution with a group of the model patterns of distance distributions that is preliminarily selected depending upon whether the pattern of the distance distribution has the concave shape or convex shape.

6. The apparatus according to claim 5, wherein the concave shape or convex shape of the pattern of the distance distribution is determined by comparing an average value of distances measured at said first position and said second position in each of said at least one linear field of view, with a distance measured at an intermediate position between the first and second positions.

7. An apparatus for determining an occupant's posture, comprising:
- a sensor having at least one pair of linear photosensor arrays each comprising a plurality of photosensor elements, said sensor forming an image of an occupant;
- a distance measurement processor that derives a distance distribution in each of at least one linear field of view that is monitored by said at least one pair of linear photosensor arrays, from the image of the occupant formed by said sensor; and
- an occupant discrimination processor that compares a pattern of the distance distribution with a plurality of model patterns of distance distributions that are preliminarily stored in the occupant discrimination processor, so as to determine the presence and posture of the occupant;
- wherein said at least one linear field of view is set to extend in a substantially horizontal direction with respect to the occupant, said occupant discrimination processor determining a distribution of distances measured at a predetermined position of said at least one linear field of view, and then determining the posture of the occupant by comparing the pattern of the distance distribution with a group of the model patterns of distance distributions that is preliminarily selected depending upon said distribution of distances.

8. The apparatus according to claim 7, wherein the posture of the occupant is normally determined based on said distribution of distances measured at said predetermined position of said at least one linear field of view, and, upon occurrence of a collision, a process of determining the posture of the occupant based on at least said distribution of distances is performed before other non-emergent processes.

9. The apparatus according to claim 7, wherein said predetermined position is a center position, as viewed in a lateral direction, of an occupant who sits in a normal posture.

10. An apparatus for determining an occupant's posture, comprising:
- a sensor having at least one pair of linear photosensor arrays each comprising a plurality of photosensor elements, said sensor forming an image of an occupant;
- a distance measurement processor that derives a distance distribution in each of at least one linear field of view that is monitored by said at least one pair of linear photosensor arrays, from the image of the occupant formed by said sensor; and
- an occupant discrimination processor that compares a pattern of the distance distribution with a plurality of model patterns of distance distributions that are preliminarily stored in the occupant discrimination processor, so as to determine the presence and posture of the occupant;
- wherein said at least one linear field of view is set to extend in a substantially horizontal direction with respect to the occupant, said occupant discrimination processor determining the posture of the occupant based on an overall judgment on symmetry of the pattern of the distance distribution in each of said at least one linear field of view, a concave or convex shape of the pattern of the distance distribution, a degree of similarity in variations in the pattern of the distance distribution between adjacent ones of said at least one linear field of view, and a distribution of distances measured at a predetermined position of said at least one linear field of view.

11. An apparatus for determining an occupant's posture, comprising:
- a sensor having at least one pair of linear photosensor arrays each comprising a plurality of photosensor elements, said sensor forming an image of an occupant;
- a distance measurement processor that derives a distance distribution in each of at least one linear field of view that is monitored by said at least one pair of linear photosensor arrays, from the image of the occupant formed by said sensor; and
- an occupant discrimination processor that compares a pattern of the distance distribution with a plurality of model patterns of distance distributions that are preliminarily stored in the occupant discrimination processor, so as to determine the presence and posture of the occupant;
- wherein said at least one linear field of view is set to extend in a substantially vertical direction with respect to the occupant, said occupant discrimination processor determining a degree of similarity between patterns of distance distributions in a pair of fields of view that are located at substantially symmetrical positions with respect to an axis of inflation of an air bag, and then determine the posture of the occupant by comparing the pattern of the distance distribution with a group of the model patterns of distance distributions that is preliminarily selected depending upon said degree of similarity.

12. The apparatus according to claim 11, wherein said degree of similarity between the patterns of distance distributions in said pair of fields of view is determined by comparing each of differences in distances measured at corresponding positions in said pair of fields of view with a predetermined value, or comparing an integral value of the differences with a predetermined value.

13. An apparatus for determining an occupant's posture, comprising:

a sensor having at least one pair of linear photosensor arrays each comprising a plurality of photosensor elements, said sensor forming an image of an occupant;

a distance measurement processor that derives a distance distribution in each of at least one linear field of view that is monitored by said at least one pair of linear photosensor arrays, from the image of the occupant formed by said sensor; and an occupant discrimination processor that compares a pattern of the distance distribution with a plurality of model patterns of distance distributions that are preliminarily stored in the occupant discrimination processor, so as to determine the presence and posture of the occupant;

wherein said at least one linear field of view is set to extend in a substantially vertical direction with respect to the occupant, said occupant discrimination processor normally determining a general posture of the occupant by deriving only a distance distribution in a field of view that is associated with an axis of inflation of an air bag, a process of determining the posture of the occupant including determination of the general posture being performed before other non-emergent processes upon occurrence of a collision.

14. An air bag system comprising an air bag that is contained in a storage portion provided in the vicinity of a seat of a motor vehicle, and a sensor that detects a shock on the motor vehicle, to cause said air bag to be inflated, the improvement comprising:

a distance sensor having at least one pair of sensor arrays, and providing distance distributions at a plurality of portions of the occupant or an object that is located in a space between said storage portion containing the air bag and said seat; and a processor that determines the posture of the occupant or a shape of the object by comparing patterns of the distance distributions with a plurality of model patterns of distance distributions, thereby to control inflation of said air bag or determine whether the air bag is to be inflated or not, depending upon the posture of the occupant or the shape of the object.

* * * * *